(12) United States Patent
Luo et al.

(10) Patent No.: US 12,287,823 B2
(45) Date of Patent: Apr. 29, 2025

(54) IMAGE SEARCH METHOD, TERMINAL, AND SERVER

(71) Applicant: HUAWEI TECHNOLOGIES CO., LTD., Shenzhen (CN)

(72) Inventors: Jianhao Luo, Nanjing (CN); Fangshan Wang, Shenzhen (CN); Fei Xiao, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/557,207

(22) PCT Filed: Apr. 7, 2022

(86) PCT No.: PCT/CN2022/085585
§ 371 (c)(1),
(2) Date: Oct. 25, 2023

(87) PCT Pub. No.: WO2022/228073
PCT Pub. Date: Nov. 3, 2022

(65) Prior Publication Data
US 2024/0220533 A1 Jul. 4, 2024

(30) Foreign Application Priority Data
Apr. 25, 2021 (CN) .......................... 202110447043.4

(51) Int. Cl.
G06F 16/532 (2019.01)
G06F 16/538 (2019.01)
G06V 10/40 (2022.01)
G06V 10/74 (2022.01)
(Continued)

(52) U.S. Cl.
CPC .......... *G06F 16/532* (2019.01); *G06F 16/538* (2019.01); *G06V 10/40* (2022.01); *G06V 10/761* (2022.01); *G06V 10/764* (2022.01); *G06V 10/82* (2022.01)

(58) Field of Classification Search
CPC ...... G06F 16/54; G06F 16/538; G06F 16/532; G06F 16/53; G06F 16/58; G06V 10/40; G06V 10/761; G06V 10/764; G06V 10/82
See application file for complete search history.

(56) References Cited

U.S. PATENT DOCUMENTS

| 2013/0076926 A1* | 3/2013 | Arnold | .................... H04N 23/66 348/E5.042 |
| 2014/0258049 A1* | 9/2014 | Gonsalves | ......... G06Q 30/0601 705/27.2 |
| 2021/0019342 A1 | 1/2021 | Peng et al. | |

FOREIGN PATENT DOCUMENTS

| CN | 107256109 A | 10/2017 |
| CN | 110019877 A | 7/2019 |

* cited by examiner

*Primary Examiner* — Etienne P Leroux
(74) *Attorney, Agent, or Firm* — Leydig, Voit & Mayer, Ltd.

(57) ABSTRACT

A search method, a terminal and a server are provided. The server returns a similar image (namely, a second image) of a first image to the terminal. When displaying the second image, the terminal further displays controls of a plurality of attributes corresponding to the second image. When the terminal detects that a user operates a first control corresponding to the second image on an interface, the terminal triggers the server to obtain first attribute information of the second image, where the first attribute information corresponds to the first control.

20 Claims, 21 Drawing Sheets

(51) Int. Cl.
*G06V 10/764* (2022.01)
*G06V 10/82* (2022.01)

Search system 100

IMAGE SEARCH METHOD, TERMINAL, AND SERVER

CROSS-REFERENCE TO RELATED APPLICATIONS

This application is a national stage of International Application No. PCT/CN2022/085585, filed on Apr. 7, 2022, which claims priority to Chinese Patent Application No. 202110447043.4 filed on Apr. 25, 2021. Both of the aforementioned applications are hereby incorporated by reference in their entireties.

TECHNICAL FIELD

Embodiments of the present invention relate to the field of image processing technologies, and in particular, to an image search method, a terminal, and a server.

BACKGROUND

Generally, a user can upload a target image to a server by using a terminal. The server searches a database based on the target image, obtains one or more images similar to the target image, and returns the one or more images to the terminal. The terminal may display a search result on a display interface, to be specific, display an identifier of the one or more images similar to the target image.

When the terminal detects that the user operates an identifier of one image on the display interface, the terminal may send an information obtaining request to the server, and the server determines related information (for example, a name of the image, a query link of the image, an encyclopedia of the image, and an image type) that is of the image and that matches the information obtaining request, and returns the related information of the image to the terminal. In this case, the terminal displays the related information of the image. It may be noted that currently, the related information of the displayed image is generally uniform content, and the content is single, which cannot satisfy a search requirement of the user in an actual application scenario.

SUMMARY

Embodiments of this application provide an image search method, a terminal, and a server, to search for personalized information of an image, and satisfy a search requirement of a user in an actual application scenario.

To achieve the foregoing objective, the following technical solutions are used in embodiments of this application.

According to a first aspect, an embodiment of this application provides an image search method. The method may be performed by a terminal, or may be performed by a component (for example, a chip, a chip system, or a processor) located in a terminal. The following provides descriptions by using an example in which the method is performed by the terminal. The method includes: requesting, in response to receiving a first operation performed by a user on a first image on a first interface, a server to search for the first image; displaying a second interface, where the second interface includes a second image and one or more controls corresponding to the second image, the second image is an image that is associated with the first image and that is found by the server, and each of the one or more controls is respectively corresponding to one or more pieces of attribute information of the second image; and requesting, in response to receiving a second operation performed by the user on a first control in the one or more controls on the second interface, the server to obtain first attribute information of the second image, where the first attribute information corresponds to the first control.

The control corresponding to the second image may be automatically determined by the server. For example, the server may determine, based on an image type of the second image, the attribute information of the control corresponding to the second image, or may determine, based on information of the second image, the attribute information of the control of the second image. In some other examples, the control corresponding to the second image may be set by the terminal by default, or may be set by the user. Controls corresponding to different second images may be the same or may be different. In some other examples, the terminal may alternatively automatically determine the control of the second image. For example, the terminal may determine the control corresponding to the second image based on the image type of the second image. In other words, when image types of the second images are different, controls corresponding to the second images are different.

In this way, the user can search for personalized information of the image by operating the first control, to satisfy a search requirement of the user in an actual application scenario. In addition, the user does not need to repeatedly perform operations such as uploading an image and inputting a query keyword to query the first attribute information of the second image, so that the user quickly queries the first attribute information of the second image.

In some implementations, before the displaying a second interface, the method further includes: determining, based on the second image and a prestored correspondence between an image and attribute information of a control, the one or more controls corresponding to the second image.

In some implementations, before the displaying a second interface, the method further includes: determining, based on a selection or setting operation performed by the user on the attribute information of the control, the one or more controls corresponding to the second image.

In a specific implementation, before the displaying a second interface, the method is specifically: displaying a third interface, where the third interface includes the second image. The displaying a second interface is specifically: displaying the second interface in response to receiving a third operation performed by the user.

In a specific implementation, the displaying the second interface in response to receiving a third operation performed by the user is specifically: sending a first request to the server in response to receiving the third operation performed by the user, where the first request carries an image identifier of the second image, and the server is configured to: determine, based on the image identifier of the second image, an image type to which the second image belongs, determine the attribute information of the control based on the image type to which the second image belongs, and return the attribute information of the control; and receiving the attribute information of the control, and displaying the control on the second interface.

In a specific implementation, the image type to which the second image belongs is a scenic spot type, and correspondingly, attribute information of the first control includes any one of a ticket, weather, navigation, and encyclopedia. The image type to which the second image belongs is a character type, and correspondingly, attribute information of the first control includes any one of a brief introduction, a deed, and work. The image type to which the second image belongs is a commodity type, and correspondingly, attribute information of the first control includes any one of a price, a review, and a detail. The image type to which the second image belongs is an animal and plant type, and correspondingly, attribute information of the first control includes any one of a feature, a growth environment, and a brief introduction.

In a specific implementation, the third operation includes at least one of the following operations: an operation on the second image; an operation of sliding a cursor of a mouse over the second image; or an operation of moving a cursor of a mouse to a related area of the second image.

In a specific implementation, the requesting, in response to receiving a second operation performed by the user on a first control in the one or more controls on the second interface, the server to obtain first attribute information of the second image is specifically: sending a second request to the server in response to receiving the second operation performed by the user on the first control on the second interface, where the second request carries the image identifier of the second image and the attribute information of the first control, and the server is configured to search for the first attribute information of the second image based on the image identifier of the second image and the attribute information of the first control, and return the first attribute information; and receiving the first attribute information of the second image.

In a specific implementation, the server is further configured to invoke, based on the image identifier of the second image, an application program API corresponding to the attribute information of the first control, to search for the first attribute information of the second image.

For example, the second image is an image of Building A, and controls of the image of Building A are displayed as "Encyclopedia", "Weather", "Ticket", and "Navigation". When the user taps the "Weather" control, the terminal detects a tapping operation performed by the user on the "Weather" control, and the terminal triggers the server to invoke a weather query API of a weather query server to obtain weather information of Building A.

According to a second aspect, an embodiment of this application provides an image search method. The method may be performed by a server, or may be performed by a component (for example, a chip, a chip system, or a processor) located in a server. The following provides descriptions by using an example in which the method is performed by the server. The method includes: receiving a first image uploaded by a terminal; determining, based on the first image, a second image corresponding to the first image; sending the second image to the terminal; receiving a first request sent by the terminal, where the first request carries an image identifier of the second image and attribute information of a first control corresponding to the second image, and the attribute information of the first control is determined based on an image type of the second image; and searching for first attribute information of the second image based on the image identifier of the second image and the attribute information of the first control.

In embodiments of this application, customization of a query function for different types of images (such as a scenic spot, a character, a commodity, and an animal and plant) is completed. Content identification of a similar image is completed, and real-time content information (such as real-time weather information) of the similar image may be automatically obtained based on a specific selection of a user. This greatly facilitates the user to obtain more content information of the similar image, and implements more intelligent display of a photographing search result.

In a specific implementation, the searching for first attribute information of the second image based on the image identifier of the second image and the attribute information of the first control is specifically: invoking, based on the image identifier of the second image, an application programming interface API corresponding to the attribute information of the first control, to query the first attribute information of the second image.

In some implementations, before the sending the second image to the terminal, the method further includes: determining the attribute information of the first control corresponding to the second image; and sending, to the terminal, the attribute information of the first control corresponding to the second image.

In a specific implementation, the determining the attribute information of the first control corresponding to the second image is specifically: determining the image type of the second image; and determining, based on the image type to which the second image belongs and a prestored correspondence between an image type and attribute information of a control, the attribute information of the first control corresponding to the second image.

In a specific implementation, the image type to which the second image belongs is a scenic spot type, and correspondingly, the attribute information of the first control includes any one of a ticket, weather, navigation, and encyclopedia. The image type to which the second image belongs is a character type, and correspondingly, the attribute information of the first control includes any one of a brief introduction, a deed, and work. The image type to which the second image belongs is a commodity type, and correspondingly, the attribute information of the first control includes any one of a price, a review, and a detail. The image type to which the second image belongs is an animal and plant type, and correspondingly, the attribute information of the first control includes any one of a feature, a growth environment, and a brief introduction.

In some implementations, before the receiving a first request sent by the terminal, the method further includes: receiving a second request sent by the terminal, where the second request carries the image identifier of the second image; based on the image identifier of the second image, searching for the second image, and identifying a first image feature of the second image; determining, based on the first image feature of the second image, the image type to which the second image belongs; and determining, based on the image type to which the second image belongs and a prestored correspondence between an image type and attribute information of a control, the attribute information of the first control corresponding to the second image.

In some implementations, after the determining, based on the first image feature of the second image, the image type to which the second image belongs, the method includes: identifying a second image feature of the second image, where the second image feature of the second image is determined based on the image type to which the second image belongs, and the second image feature of the second image and the first image feature of the second image are features at different segmentation levels; and determining second attribute information of the second image based on the second image feature of the second image, where the second attribute information is different from the first attribute information.

In some implementations, before the receiving a first request sent by the terminal, the method further includes: receiving a second request sent by the terminal, where the second request carries the image identifier of the second image; searching, based on the image identifier of the second image, for the image type to which the second image belongs; and determining, based on the image type to which the second image belongs and a prestored correspondence between an image type and attribute information of a control, the attribute information of the first control corresponding to the second image.

According to a third aspect, a terminal is provided, where the terminal may include a searching unit, configured to: in response to receiving a first operation performed by a user on a first image on a first interface, request a server to search for the first image; a first displaying unit, configured to display a second interface, where the second interface includes a second image and one or more controls corresponding to the second image, the second image is an image that is associated with the first image and that is found by the server, and each of the one or more controls respectively corresponds to one or more pieces of attribute information of the second image; and an obtaining unit, configured to: in response to receiving a second operation performed by the user on a first control in the one or more controls on the second interface, request the server to obtain first attribute information of the second image, where the first attribute information corresponds to the first control.

In some implementations, the terminal further includes a first determining unit, configured to determine, based on the second image and a prestored correspondence between an image and attribute information of a control, the one or more controls corresponding to the second image.

In some implementations, the terminal further includes a second determining unit, configured to determine, based on a selection or setting operation performed by the user on the attribute information of the control, the one or more controls corresponding to the second image.

In some implementations, the terminal further includes a second displaying unit, configured to display a third interface, where the third interface includes the second image. The first displaying unit is further configured to display the second interface in response to receiving a third operation performed by the user.

In a specific implementation, the first displaying unit is further configured to: in response to receiving the third operation performed by the user, send a first request to the server, where the first request carries an image identifier of the second image, and the server is configured to: determine, based on the image identifier of the second image, an image type to which the second image belongs, determine the attribute information of the control based on the image type to which the second image belongs, and return the attribute information of the control; and receive the attribute information of the control, and display the control on the second interface.

In a specific implementation, the image type to which the second image belongs is a scenic spot type, and correspondingly, attribute information of the first control includes any one of a ticket, weather, navigation, and encyclopedia. The image type to which the second image belongs is a character type, and correspondingly, attribute information of the first control includes any one of a brief introduction, a deed, and work. The image type to which the second image belongs is a commodity type, and correspondingly, attribute information of the first control includes any one of a price, a review, and a detail. The image type to which the second image belongs is an animal and plant type, and correspondingly, attribute information of the first control includes any one of a feature, a growth environment, and a brief introduction.

In a specific implementation, the third operation includes at least one of the following operations: an operation on the second image; an operation of sliding a cursor of a mouse over the second image; or an operation of moving a cursor of a mouse to a related area of the second image.

In a specific implementation, the obtaining unit is further configured to: send a second request to the server in response to receiving the second operation performed by the user on the first control on the second interface, where the second request carries the image identifier of the second image and the attribute information of the first control, and the server is configured to search for the first attribute information of the second image based on the image identifier of the second image and the attribute information of the first control, and return the first attribute information; and receive the first attribute information of the second image.

In a specific implementation, the server is further configured to invoke, based on the image identifier of the second image, an application program API corresponding to the attribute information of the first control, to search for the first attribute information of the second image.

According to a fourth aspect, a server is provided, where the server includes: a first receiving unit, configured to receive a first image uploaded by a terminal; a first determining unit, configured to determine, based on the first image, a second image corresponding to the first image; a first sending unit, configured to send the second image to the terminal; a first receiving unit, configured to receive a first request sent by the terminal, where the first request carries an image identifier of the second image and attribute information of a first control corresponding to the second image, and the attribute information of the first control is determined based on an image type of the second image; and a searching unit, configured to search for the first attribute information of the second image based on the image identifier of the second image and the attribute information of the first control.

In a specific implementation, the searching unit is further configured to invoke, based on the image identifier of the second image, an application programming interface API corresponding to the attribute information of the first control, to query the first attribute information of the second image.

In some implementations, the server further includes: a second determining unit, configured to determine the attribute information of the first control corresponding to the second image; and a second sending unit, configured to send, to the terminal, attribute information of the first control corresponding to the second image.

In a specific implementation, the second determining unit is further configured to: determine the image type of the second image; and determine, based on the image type to which the second image belongs and a prestored correspondence between an image type and attribute information of a control, the attribute information of the first control corresponding to the second image.

In a specific implementation, the image type to which the second image belongs is a scenic spot type, and correspondingly, the attribute information of the first control includes any one of a ticket, weather, navigation, and encyclopedia. The image type to which the second image belongs is a character type, and correspondingly, the attribute information of the first control includes any one of a brief introduction, a deed, and work. The image type to which the second image belongs is a commodity type, and correspondingly, the attribute information of the first control includes any one of a price, a review, and a detail. The image type to which the second image belongs is an animal and plant type, and correspondingly, the attribute information of the first control includes any one of a feature, a growth environment, and a brief introduction.

In some implementations, the server further includes: a second receiving unit, configured to receive a second request sent by the terminal, where the second request carries the image identifier of the second image; a first searching unit, configured to: based on the image identifier of the second image, search for the second image, and identify a first image feature of the second image; a third determining unit, configured to determine, based on the first image feature of the second image, the image type to which the second image belongs; and a fourth determining unit, configured to determine, based on the image type to which the second image belongs and a prestored correspondence between an image type and attribute information of a control, the attribute information of the first control corresponding to the second image.

In some implementations, the server further includes: an identification unit, configured to identify a second image feature of the second image, where the second image feature of the second image is determined based on the image type to which the second image belongs, and the second image feature of the second image and the first image feature of the second image are features at different segmentation levels; and a fifth determining unit, configured to determine second attribute information of the second image based on the second image feature of the second image, where the second attribute information is different from the first attribute information.

In some implementations, the server further includes: a second receiving unit, configured to receive a second request sent by the terminal, where the second request carries the image identifier of the second image; a second searching unit, configured to search, based on the image identifier of the second image, for the image type to which the second image belongs; and a fifth determining unit, configured to determine, based on the image type to which the second image belongs and a prestored correspondence between an image type and attribute information of a control, the attribute information of the first control corresponding to the second image.

According to a fifth aspect, a computer-readable storage medium is provided. The computer-readable storage medium includes computer instructions. When the computer instructions are run on an electronic device, the electronic device is enabled to perform the image search method according to the first aspect or the image search method according to the second aspect.

According to a sixth aspect, a computer program is provided. When the program is invoked by a processor, the image search method according to the first aspect is performed, or the image search method according to the second aspect is performed.

According to a seventh aspect, a chip system includes one or more processors. When the one or more processors execute instructions, the one or more processors perform the image search method in the first aspect or the clock synchronization method in the second aspect.

For specific implementations and corresponding technical effects of the embodiments in the third aspect to the seventh aspect, refer to the specific implementations and technical effects of the first aspect and the second aspect.

In embodiments of this application, the server returns a similar image (namely, the second image) of the first image to the terminal. When displaying the second image, the terminal further displays controls of a plurality of attributes corresponding to the second image. When the terminal detects that the user operates the first control corresponding to the second image on the interface, the terminal triggers the server to obtain the first attribute information of the second image, where the first attribute information corresponds to the first control. It can be learned that the user can search for personalized information of the image by operating the first control, to satisfy a search requirement of the user in an actual application scenario. In addition, the user does not need to repeatedly perform operations such as uploading an image and inputting a query keyword to query the first attribute information, so that the user quickly queries the first attribute information of the second image.

BRIEF DESCRIPTION OF DRAWINGS

To explain the technical solutions in embodiments of this application more clearly, the following briefly describes accompanying drawings used for describing the embodiments or a current technology. It is clear that the accompanying drawings in the following descriptions show merely some embodiments of this application, and a person of ordinary skill in the art may still derive other drawings from these accompanying drawings without creative efforts.

DESCRIPTION OF EMBODIMENTS

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise specified, "a plurality of" means two or more.

Figure 1:
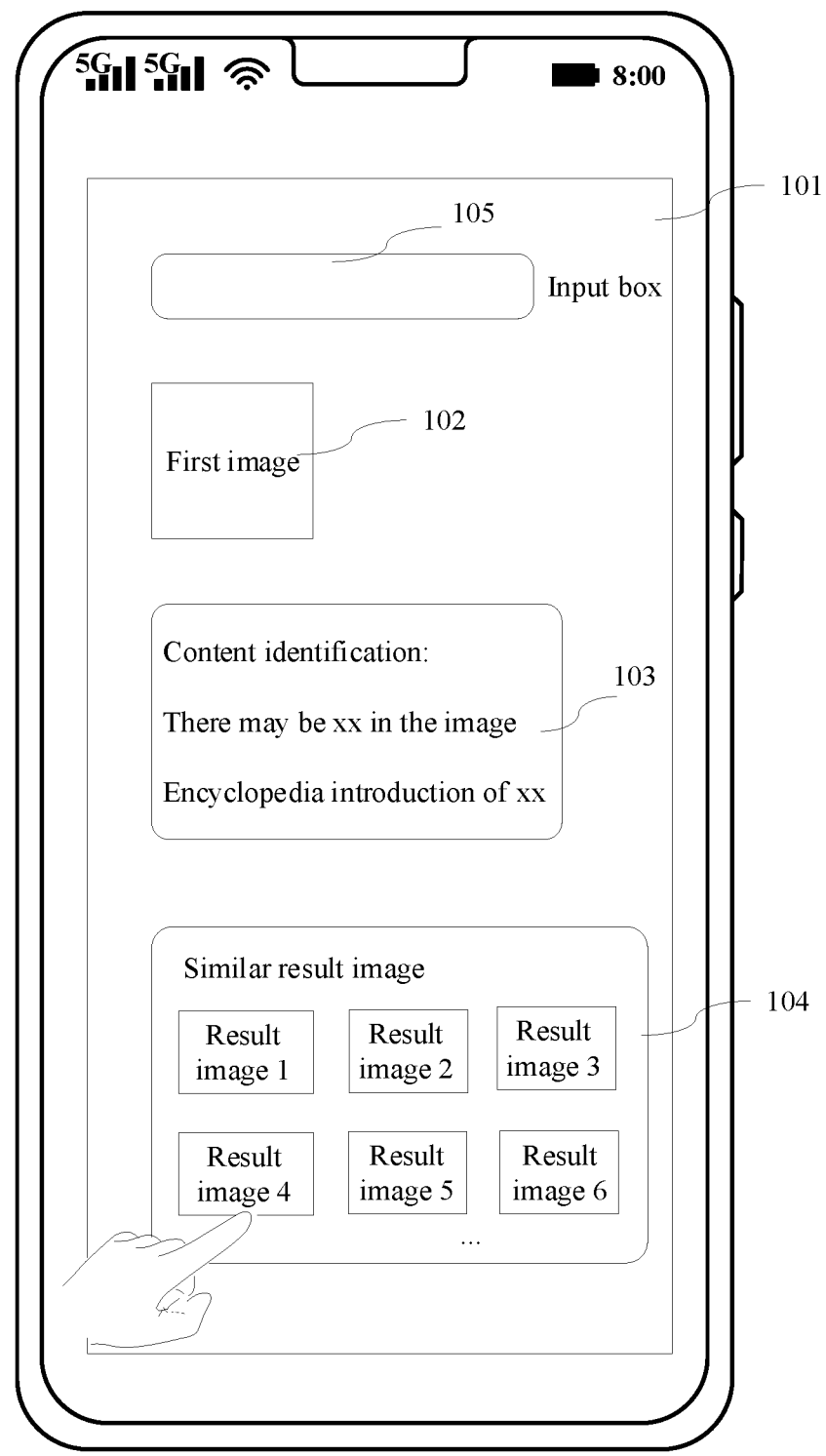
FIG. 1 is a schematic diagram of a display interface on a terminal.

Generally, a user can identify content of a target image by using an image search APP on a terminal, an image search website, or the like, and search for an image similar to the target image, that is, "searching for an image by an image". For example, the user inputs the target image into an input box on a page of the APP on the terminal. The APP uploads the target image to a server. The server searches a database based on the target image, obtains a content identification result of the target image and one or more images similar to the target image, and sends the content identification result and the one or more images to the terminal. FIG. 1 is a schematic diagram of an interface 101 for displaying a search result on a terminal. The interface 101 displays a target image, namely, a first image 102, that is searched for, a found content identification result 103 (for example, there may be xx in the image and information such as an encyclopedia introduction of xx) of the first image, and one or more images 104 (for example, a result image 1, a result image 2, a result image 3, a result image 4, a result image 5, and a result image 6 shown in FIG. 1) similar to the first image.

Figure 2:
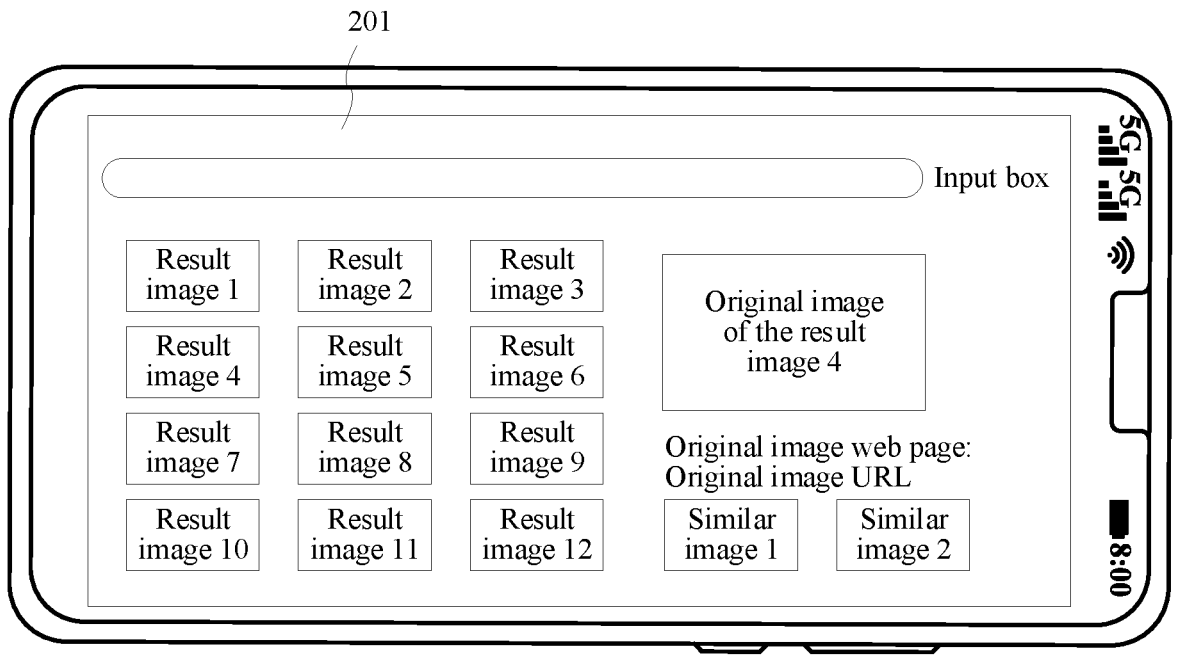
FIG. 2 is a schematic diagram of still another display interface on a terminal.

When the terminal detects an identifier indicating that a user operates one image (for example, the result image 4 shown in FIG. 1) on the interface 101 shown in FIG. 1, the terminal may send, to a server, an information obtaining request corresponding to the result image 4. The server receives the information obtaining request sent by the terminal, determines an original image of the result image 4 that matches the information obtaining request, related information (for example, a query link of the result image 4), and a similar image of the result image 4, and then returns, to the terminal, the original image of the result image 4, the related information, and the similar image of the result image 4. In this case, the terminal may display an interface 201 shown in FIG. 2. The interface 201 displays the original image (for example, the original image of the result image 4 shown in FIG. 2) of the foregoing result image 4, the related information (for example, an original image web page: an original image URL shown in FIG. 2), and similar images (for example, a similar image 1 and a similar image 2 shown in FIG. 2) of the result image 4.

Figure 3:
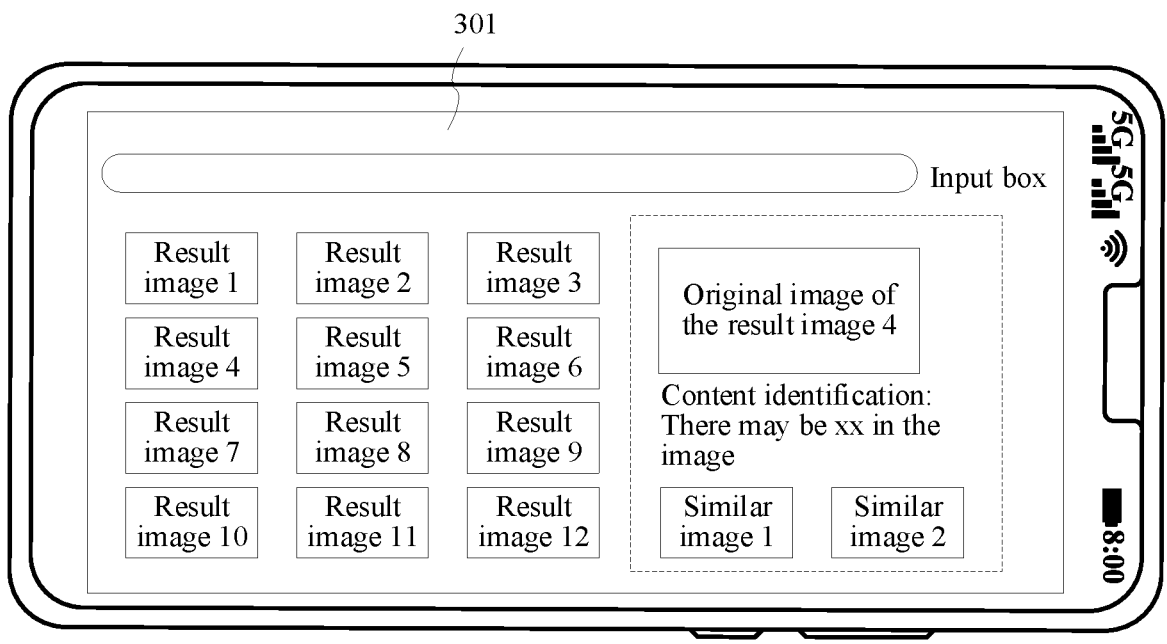
FIG. 3 is a schematic diagram of still another display interface on a terminal.

Alternatively, when the terminal detects an identifier indicating that the user operates one image (for example, the result image 4 in FIG. 1) on the interface 101 shown in FIG. 1, the display interface of the terminal may jump from the interface 101 shown in FIG. 1 to an interface 301 shown in FIG. 3. The interface 301 shown in FIG. 3 is different from the interface 201 shown in FIG. 2 in that related information content of the original image of the result image 4 is different. For example, on the interface 301, the related information of the original image of the result image 4 is "There may be xx in the image" shown in FIG. 3.

In conclusion, it can be learned that, an example in which the result image 4 is a scenic spot image (for example, "Building A") is used, and when the user wants to further learn second information (for example, a ticket of the scenic spot, weather of the scenic spot, or a location of the scenic spot) of "Building A", the user needs to query the second information of "Building A" again. For example, the user may request, by inputting "Building A" and a keyword corresponding to the second information of "Building A" into a search engine, the server corresponding to the search engine to search for the second information of "Building A". It can be learned that the user needs to repeatedly perform operations such as uploading an image and inputting a query keyword. The operations are complex, and it is inconvenient for the user to quickly query the second information of the result image 4.

Figure 4:
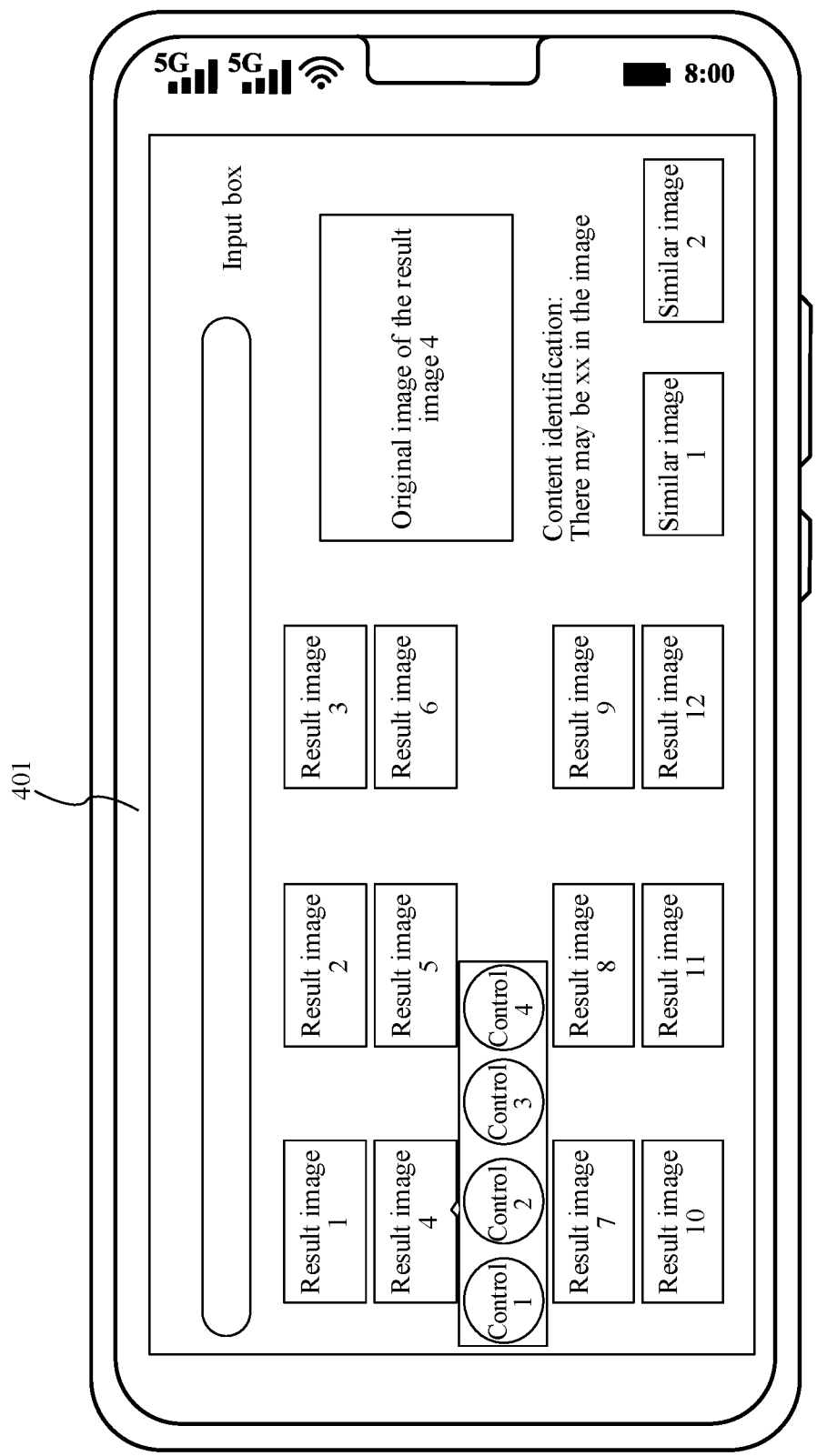
FIG. 4 is a schematic diagram of a display page on a terminal according to an embodiment of this application.

To resolve the foregoing technical problem, in embodiments of this application, the server returns the similar image (namely, a second image) of the first image to the terminal. When displaying the second image, the terminal further displays controls (for example, a control 1, a control 2, a control 3, and a control 4 on an interface shown in FIG. 4) of a plurality of attributes corresponding to the second image. When the terminal detects that the user operates, on the interface 401 shown in FIG. 4, a target control (for example, one of the control 1, the control 2, the control 3, and the control 4) corresponding to the second image (a result image 4 shown in FIG. 4), the terminal triggers the server to obtain second information of the second image, where the second information is determined based on attribute information of the target control. It can be learned that the user can search for personalized information of the image by operating the target control, to satisfy a search requirement of the user in an actual application scenario. In addition, the user does not need to repeatedly perform operations such as uploading an image and inputting a query keyword to query the second information, so that the user quickly queries the second information of the second image.

In some examples, the control corresponding to the second image may be automatically determined by the server. For example, the server may determine, based on an image type of the second image, the attribute information of the control corresponding to the second image, or may determine, based on the information of the second image, the attribute information of the control of the second image. In some other examples, the control corresponding to the second image may be set by the terminal by default, or may be set by the user. Controls corresponding to different second images may be the same or may be different. In some other examples, the terminal may alternatively automatically determine the control of the second image. For example, the terminal may determine the control corresponding to the second image based on the image type of the second image. In other words, when image types of the second images are different, the controls corresponding to the second images are different.

Figure 7:
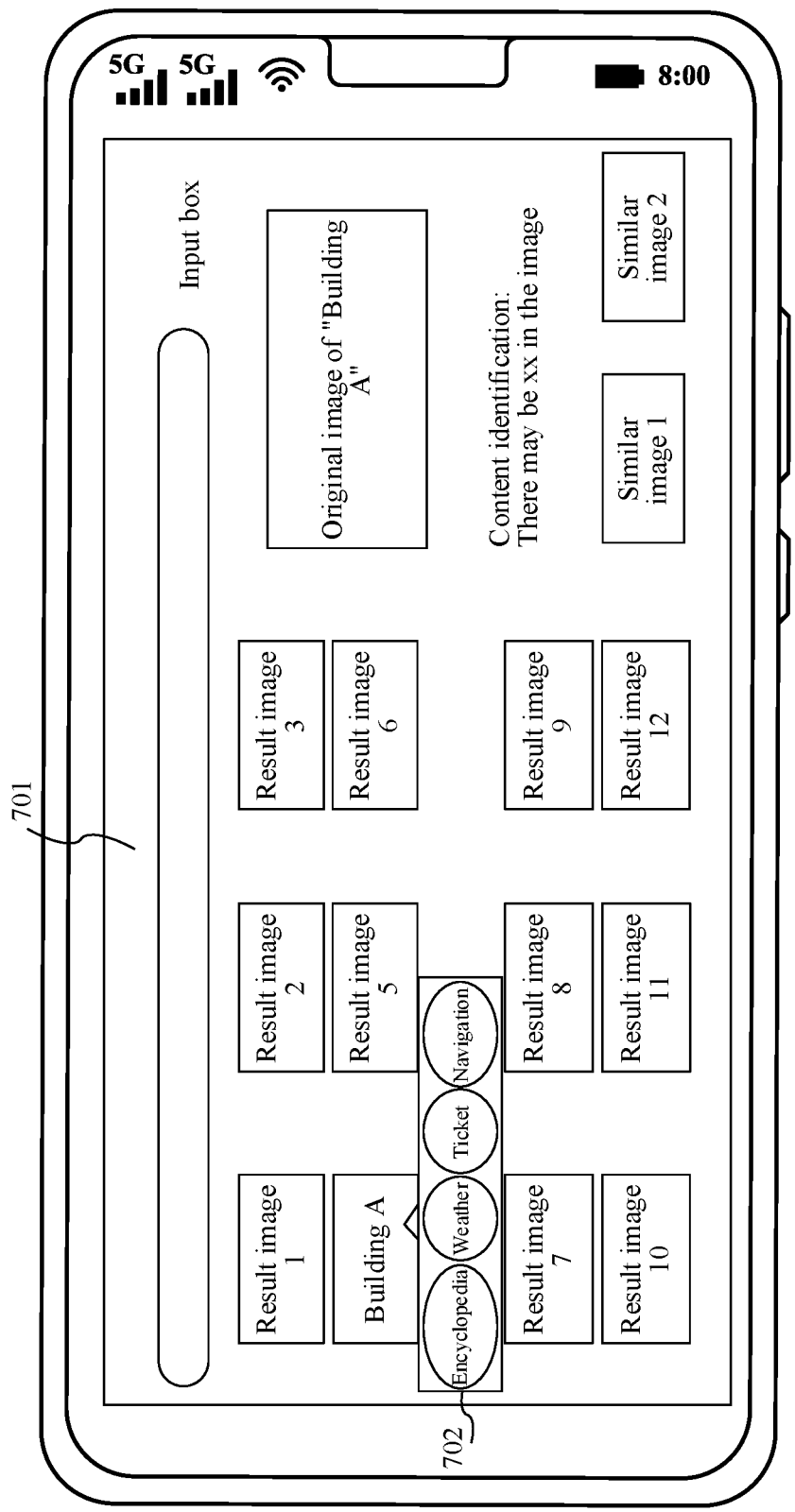
FIG. 7 is a schematic diagram of an application scenario of a display interface on a terminal according to an embodiment of this application.

For example, when the image type of the second image is the scenic spot type, correspondingly, the attribute information of the controls corresponding to the second image may include information such as a ticket, weather, navigation, and encyclopedia. For example, FIG. 7 is a schematic diagram of an application scenario of a display interface on the terminal according to an embodiment of this application. For example, the second image (namely, the foregoing result image 4) is an image of Building A. On an interface 701 shown in FIG. 7, controls 702 of the image of Building A may be displayed as "Encyclopedia", "Weather", "Ticket", and "Navigation".

Figure 5:
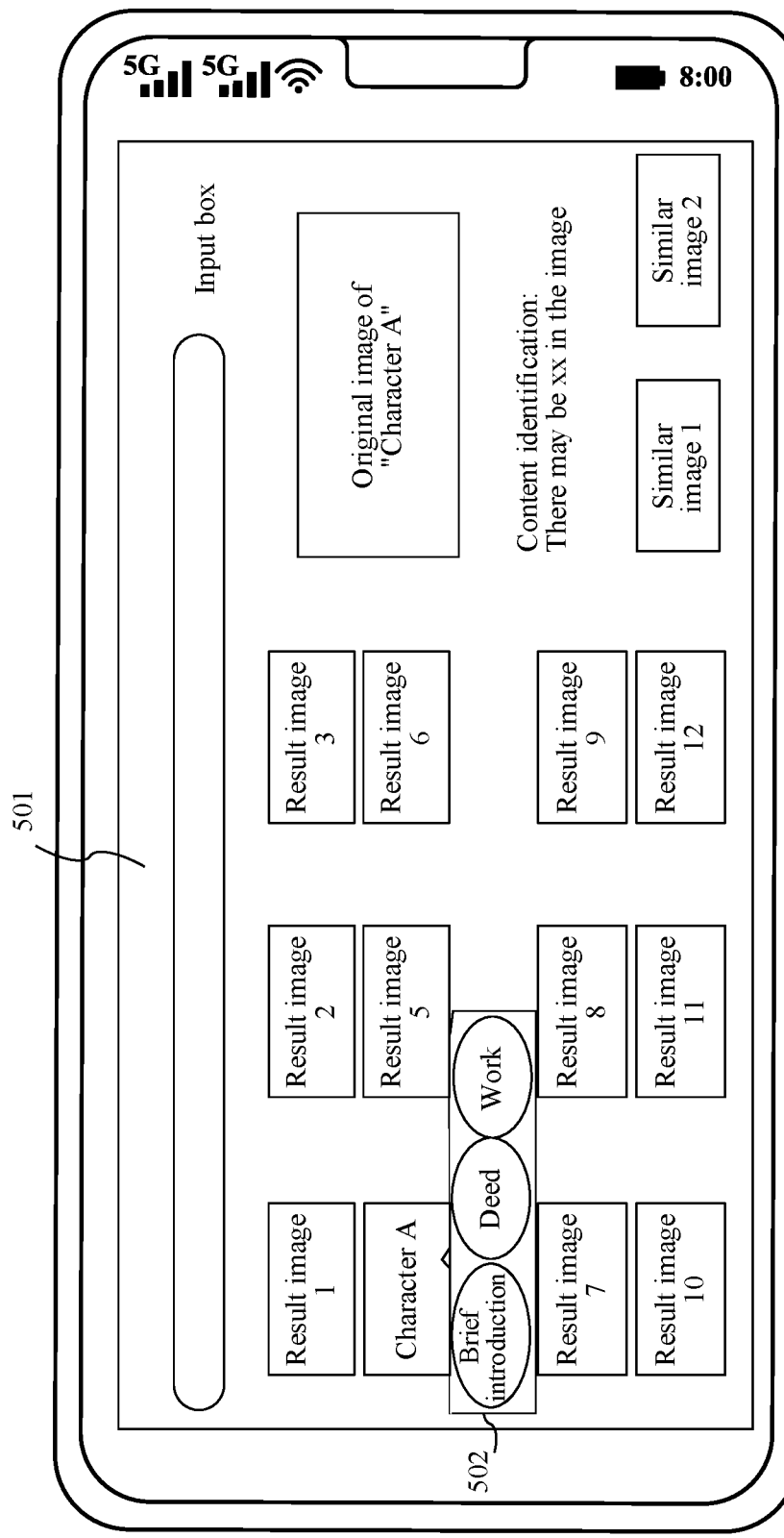
FIG. 5 is a schematic diagram of an application scenario of a display interface on a terminal according to an embodiment of this application.

Similarly, when the image type of the second image is a character type, correspondingly, the attribute information of the controls corresponding to the second image may include information such as a brief introduction, a deed, and work. For example, FIG. 5 is a schematic diagram of an application scenario of a display interface on the terminal according to an embodiment of this application. For example, the second image (namely, the foregoing result image 4) is an image of Character A. On an interface 501 shown in FIG. 5, controls 502 of the image of Character A may be displayed as "Brief introduction", "Century", and "Work".

Figure 6:
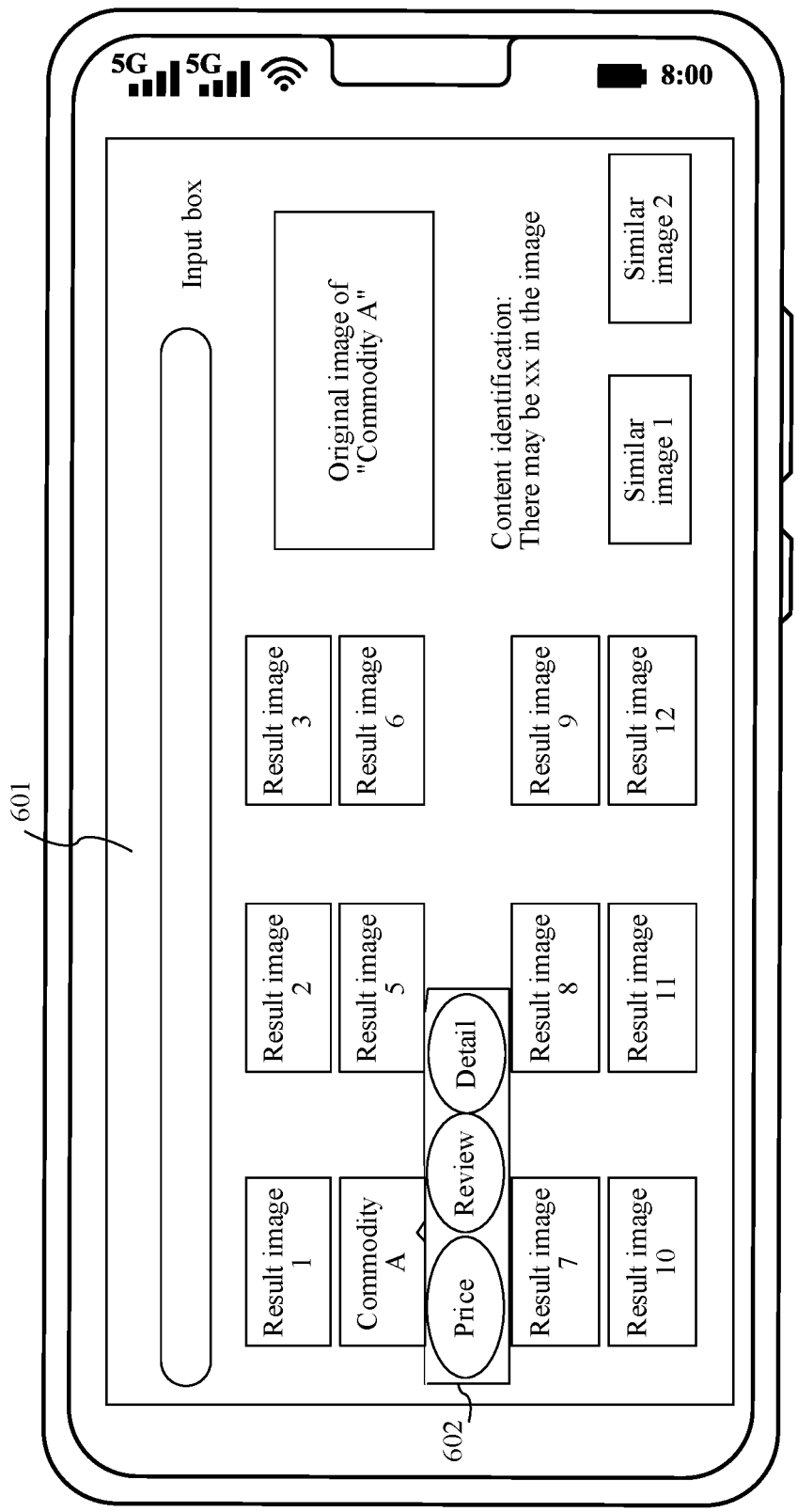
FIG. 6 is a schematic diagram of an application scenario of a display interface on a terminal according to an embodiment of this application.

Similarly, when the image type of the second image is a commodity type, correspondingly, the controls corresponding to the second image may include information such as a price, a review, and a detail. For example, FIG. 6 is a schematic diagram of an application scenario of a display interface on the terminal according to an embodiment of this application. For example, the second image (namely, the foregoing result image 4) is an image of Commodity A. On an interface 601 shown in FIG. 6, controls 602 of the image of Commodity A may be displayed as "Price", "Review", and "Detail".

Similarly, when the image type of the second image is an animal and plant type, correspondingly, the attribute information of the controls corresponding to the second image may include information such as an animal and plant feature, an animal and plant growth environment, and a brief animal and plant introduction. Certainly, the image type of the second image and the corresponding control are not specifically limited in this embodiment of this application.

In some examples, the second information of the second image obtained by the server may be obtained by the server by invoking an application programming interface API corresponding to the attribute information of the target control. Specifically, the server may invoke an API, of the server, corresponding to the attribute information of the target control, to query the second information of the second image. Alternatively, the server may determine an API corresponding to the attribute information of the target control, and invoke the API to query the second information of the second image from another server.

Figure 8:
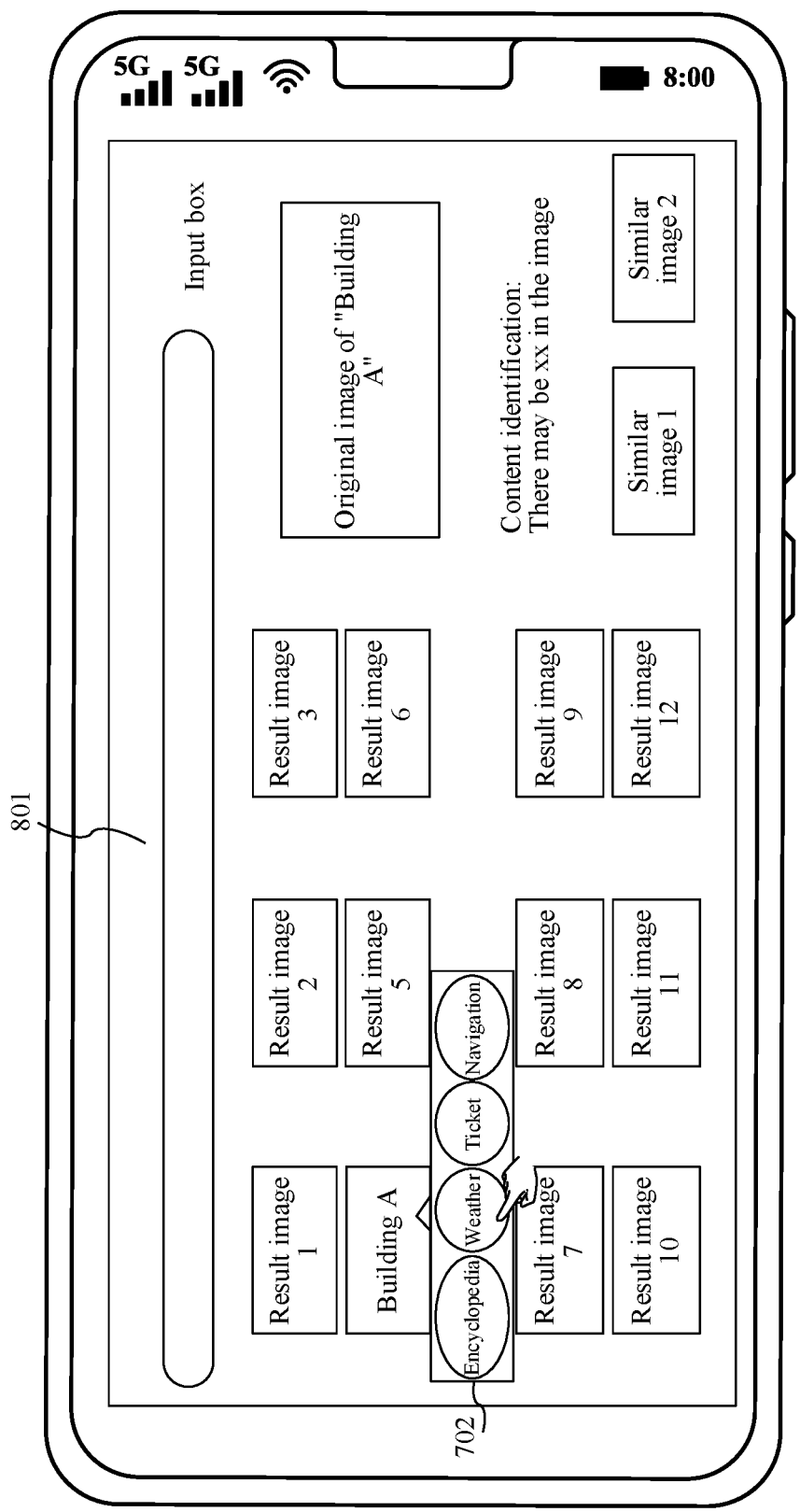
FIG. 8 is a schematic diagram of an application scenario of a display page on a terminal according to an embodiment of this application.

For example, the example in FIG. 7 is still used, and the controls of the image of Building A are displayed as "Encyclopedia", "Weather", "Ticket", and "Navigation". When the terminal detects that the user operates a "Ticket" control, the terminal triggers the server to invoke a ticket query API of a ticket query server to obtain ticket information of Building A. FIG. 8 is a schematic diagram of an application scenario of a display page on a terminal according to an embodiment of this application. On an interface 801 shown in FIG. 8, the user taps a "Weather" control. The terminal detects a tapping operation performed by the user on the "Weather" control, and the terminal triggers the server to invoke a weather query API of a weather query server to obtain weather information of Building A. The weather information may include information such as a name of "Building A", a city to which "Building A" belongs, a weather condition in a current day, and weather in the next seven days.

Figure 9:
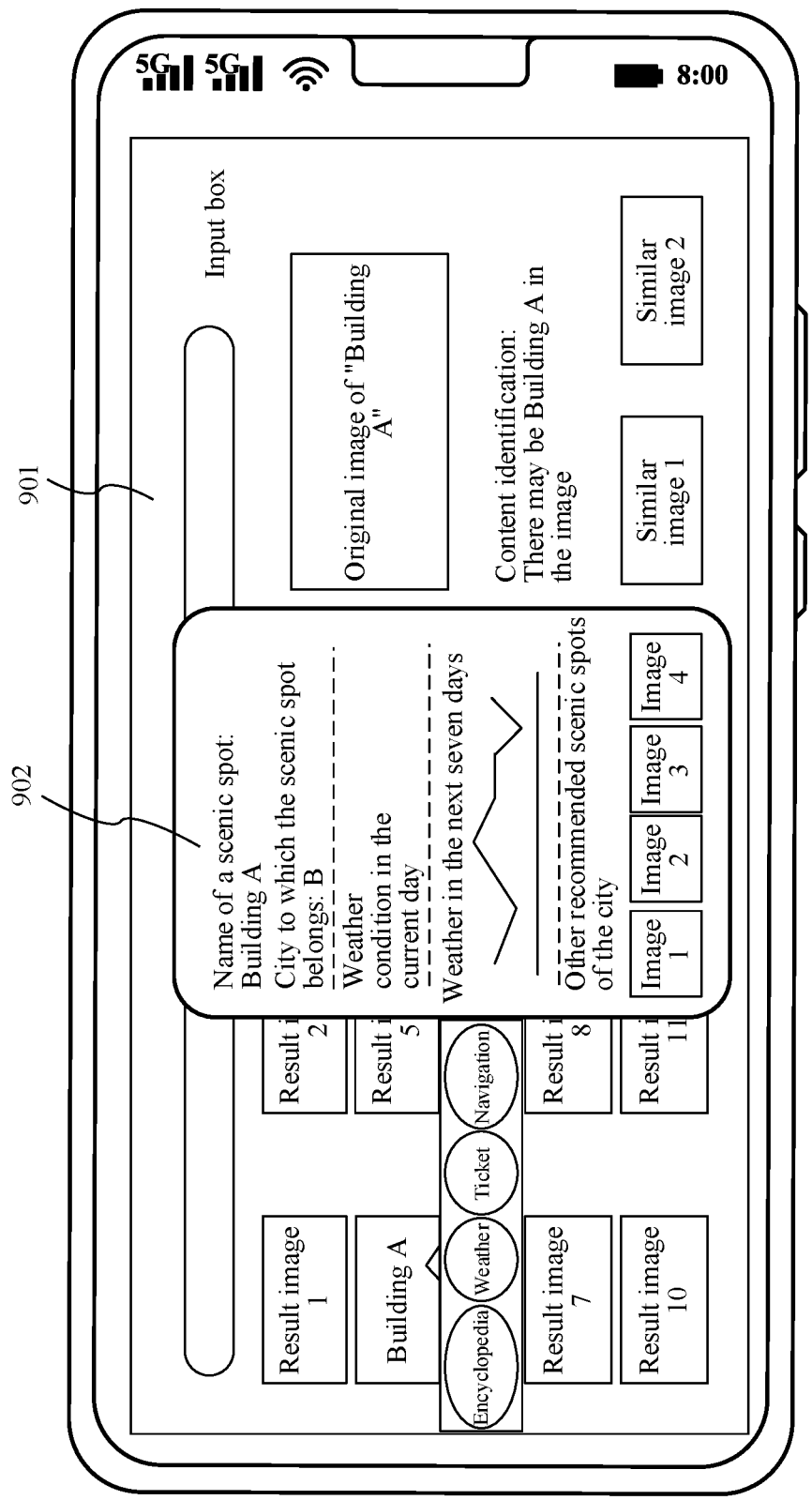
FIG. 9 is a schematic diagram of an application scenario of a display page on a terminal according to an embodiment of this application.

Further, the terminal may obtain the second information of the second image that is found by the server, and display indication information of the second image. For example, FIG. 9 is a schematic diagram of an application scenario of a display page on the terminal according to an embodiment of this application. The terminal displays the weather information of "Building A" in a card form. For example, the foregoing embodiment is still used. The following content is displayed on a card 902 displayed on an interface 901 shown in FIG. 9: a name of a scenic spot: Building A; a city to which the scenic spot belongs: B; a weather condition in a current day: 20° C.; a weather change curve in the next seven days; and other information such as a recommended scenic spot of City B. It can be learned that query information is displayed in the card form instead of being displayed in a simple listing manner, so that it is more convenient and the information is clearly displayed.

With reference to the accompanying drawings in embodiments of this application, the following describes an image search method provided in embodiments of this application.

Figure 10:
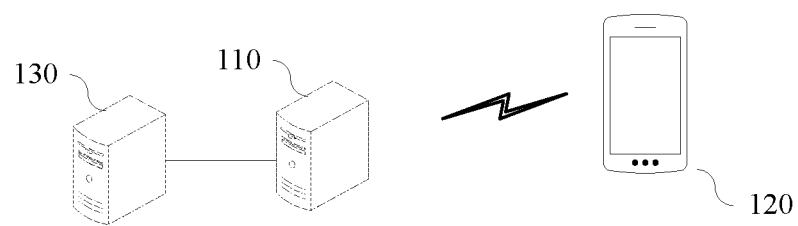
FIG. 10 is a schematic diagram of a structure of a search system including a terminal and a server according to an embodiment of this application.

The image search method provided in embodiments of this application may be applied to a search system including a terminal and a server shown in FIG. 10. As shown in FIG. 10, the search system 100 may include the server 110 and the terminal 120. The search system 100 may further include another server 130.

The server 110 may include a convolutional neural network (CNN), and the CNN network model is used to identify a category of an image. Various service APIs (application programming interface) are used to query various types of real-time information, for example, weather of a place and real-time ticket information of a scenic spot.

The another server 130 may include various service APIs, and the API is used to query various types of real-time information, for example, weather of a place and real-time ticket information of a scenic spot. In an implementation, the server 110 may invoke the various service APIs on the another server 130 to query various types of real-time information.

A client may be installed on the terminal 120. The client may be configured to obtain an image input by a user. The image may be an image stored in a database, or may be an image obtained by invoking a camera to perform photographing. The client may be further configured to upload the image to the server, and receive and display a query result returned by the server. The client may be further configured to: in response to a trigger operation on a result image, jump to an original web page of the result image. The client may be further configured to invoke an external browser.

The terminal 120 may be a device having a display function, such as a mobile phone, a tablet computer, a desktop computer, a laptop computer, a notebook computer, an ultra-mobile personal computer (UMPC), a handheld computer, a netbook, a personal digital assistant (PDA), a wearable electronic device, or a virtual reality device. A specific form of the terminal is not particularly limited in this embodiment of this application.

Figure 11:
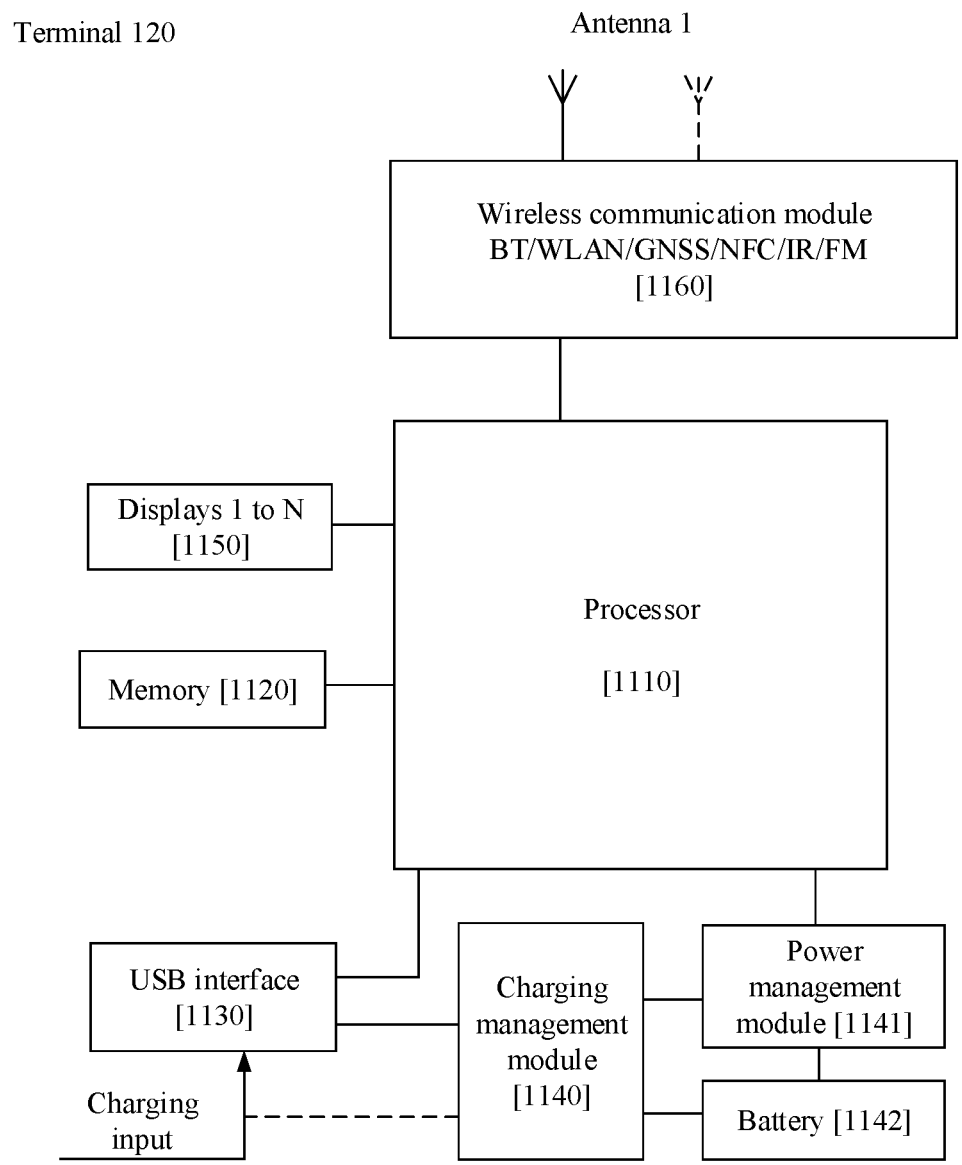
FIG. 11 is a block diagram of a structure of a terminal according to an embodiment of this application.

FIG. 11 is a block diagram of a structure of the terminal 120.

As shown in FIG. 11, the terminal 120 may include a processor 1110, a memory 1120, a universal serial bus (USB) interface 1130, a charging management module 1140, a power management module 1141, a battery 1142, a display 1150, an antenna 1, a wireless communication module 1160, and the like.

It may be understood that the structure shown in this embodiment of the present invention does not constitute a specific limitation on the terminal 120. In some other embodiments of this application, the terminal 120 may include more or fewer components than those shown in the figure, combine some components, split some components, or have different component arrangements. The components shown in the figure may be implemented by hardware, software, or a combination of software and hardware.

The processor 1110 may include one or more processing units. For example, the processor 1110 may include an application processor (AP), a modem processor, a graphics processing unit (GPU), an image signal processor (ISP), a controller, a video codec, a digital signal processor (DSP), a baseband processor, and/or a neural network processing unit (NPU). Different processing units may be independent components, or may be integrated into one or more processors.

The controller may generate an operation control signal based on instruction operation code and a time sequence signal, to complete control of instruction reading and instruction execution.

A memory may be further disposed in the processor 1110, and is configured to store instructions and data. In some embodiments, the memory in the processor 1110 is a cache. The cache may store instructions or data just used or cyclically used by the processor 1110. If the processor 1110 needs to use the instructions or the data again, the processor 1110 may directly invoke the instructions or the data from the cache. This avoids repeated access and reduces waiting time of the processor 1110, to improve system efficiency.

In some embodiments, the processor 1110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that an interface connection relationship between the modules shown in this embodiment of the present invention is merely an example for description, and does not constitute a limitation on the structure of the terminal 120. In some other embodiments of this application, the terminal 120 may alternatively use an interface connection manner different from that in the foregoing embodiment, or a combination of a plurality of interface connection manners.

The memory 1120 may be configured to store computer executable program code, and the executable program code includes instructions. The memory 1120 may include a program storage area and a data storage area. The program storage area may store an operating system, an application needed by at least one function (for example, a voice playing function or an image playing function), and the like. The data storage area may store data (such as audio data and a phone book) created during use of the terminal 120, and the like. In addition, the memory 1120 may include a high-speed random access memory, and may further include a non-volatile memory, for example, at least one magnetic disk storage device, a flash memory device, or a universal flash storage (UFS). The processor 1110 executes various functional applications and data processing of the terminal 120 by running instructions stored in the memory 1120 and/or instructions stored in the memory disposed in the processor.

The charging management module 1140 is configured to receive charging input from a charger. The charger may be a wireless charger or a wired charger. In some embodiments of wired charging, the charging management module 1140 may receive charging input from the wired charger through the USB interface 1130. In some embodiments of wireless charging, the charging management module 1140 may receive wireless charging input by using a wireless charging coil of the terminal 120. When charging the battery 1142, the charging management module 1140 may further supply power to a wearable device by using the power management module 1141.

The power management module 1141 is configured to connect to the battery 1142, the charging management module 1140, and the processor 1110. The power management module 1141 receives input of the battery 1142 and/or the charging management module 1140, and supplies power to the processor 1110, the memory 1120, the display 1150, the wireless communication module 1160, and the like. The power management module 1141 may be further configured to monitor parameters such as a battery capacity, a quantity of battery cycles, and a battery health status (electric leakage or impedance). In some other embodiments, the power management module 1141 may alternatively be disposed in the processor 1110. In some other embodiments, the power management module 1141 and the charging management module 1140 may alternatively be disposed in a same device.

A wireless communication function of the terminal 120 may be implemented by using the antenna 1, the wireless communication module 1160, the modem processor, the baseband processor, and the like.

The antenna 1 is configured to transmit and receive an electromagnetic wave signal. Each antenna in the terminal 120 may be configured to cover one or more communication frequency bands. Different antennas may be further multiplexed, to improve antenna utilization. In some other embodiments, the antenna may be used in combination with a tuning switch.

The terminal 120 implements a display function by using the GPU, the display 1150, the application processor, and the like. The GPU is a microprocessor for image processing, and is connected to the display 1150 and the application processor. The GPU is configured to: perform mathematical and geometric computation, and render an image. The processor 1110 may include one or more GPUs, and the one or more GPUs execute program instructions to generate or change display information.

The display 1150 is configured to display an image, a video, and the like. The display 1150 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the terminal 120 may include one or N displays 1150, where N is a positive integer greater than 1.

In this embodiment of this application, the display 1150 may be configured to display a second image similar to a first image and a control corresponding to the second image. For a method for determining the control, refer to related content in embodiments of this application. Details are not described herein again.

The wireless communication module 1160 may provide a wireless communication solution that is applied to the terminal 120 and that includes a wireless local area network (WLAN) (such as a wireless fidelity (Wi-Fi) network), Bluetooth (BT), a global navigation satellite system (GNSS), frequency modulation (FM), a near field wireless communication (NFC) technology, and an infrared (IR) technology. The wireless communication module 1160 may be one or more components integrating at least one communication processing module. The wireless communication module 1160 receives an electromagnetic wave through the antenna 1, performs frequency modulation and filtering processing on an electromagnetic wave signal, and sends a processed signal to the processor 1110. The wireless communication module 1160 may further receive a to-be-sent signal from the processor 1110, perform frequency modulation and amplification on the signal, and convert the signal into an electromagnetic wave for radiation through the antenna 1.

Certainly, the terminal 120 may further include another functional unit. This is not limited in this embodiment of this application.

The following uses the architecture shown in FIG. 11 as an example, to describe the image search method provided in embodiments of this application. Units in the following embodiments may have the components shown in FIG. 11. Details are not described again. It should be noted that, in embodiments of this application, names of messages exchanged between devices, names of parameters in the messages, or the like are merely examples. Another name may alternatively be used during specific implementation. In embodiments of this application, generating may also be understood as creating or determining, and "include" in embodiments of this application may also be understood as "carry". This is uniformly described herein. This is not specifically limited in embodiments of this application.

In addition, actions, terms, and the like in embodiments of this application may be mutually referenced. This is not limited. In embodiments of this application, names of messages exchanged between devices, names of parameters in the messages, or the like are merely examples. Another name may alternatively be used during specific implementation. This is not limited.

The foregoing describes related content of "searching for an image by an image". Certainly, a user may alternatively search for an image related to a keyword by using an image search APP on a terminal, that is, "searching for an image by a text". For example, the user inputs a query keyword into an input box on a page of the APP on the terminal, and the APP uploads the keyword to a server. The server searches a database based on the keyword, obtains one or more images related to the keyword and related information of the image, and sends the images and the related information to the terminal.

Alternatively, the user may search for a video related to the image by using the image search APP on the terminal, that is, "searching for a video by an image". For example, the user inputs a target image into the input box on the page of the APP on the terminal, and the APP uploads the target image to the server. The server searches the database based on the target image, obtains one or more videos related to the target image and related information of the video, and sends the videos and the related information to the terminal.

Therefore, in embodiments of this application, "searching for an image by an image" is not limited, and "searching for an image by a text" or "searching for a video by an image" may be alternatively used. Certainly, another case may be used. This is not specifically limited in embodiments of this application. In embodiments of this application, an example of "searching for an image by an image" is used for description in detail.

The following describes in detail an image search method provided in an embodiment of this application.

Figure 12A:
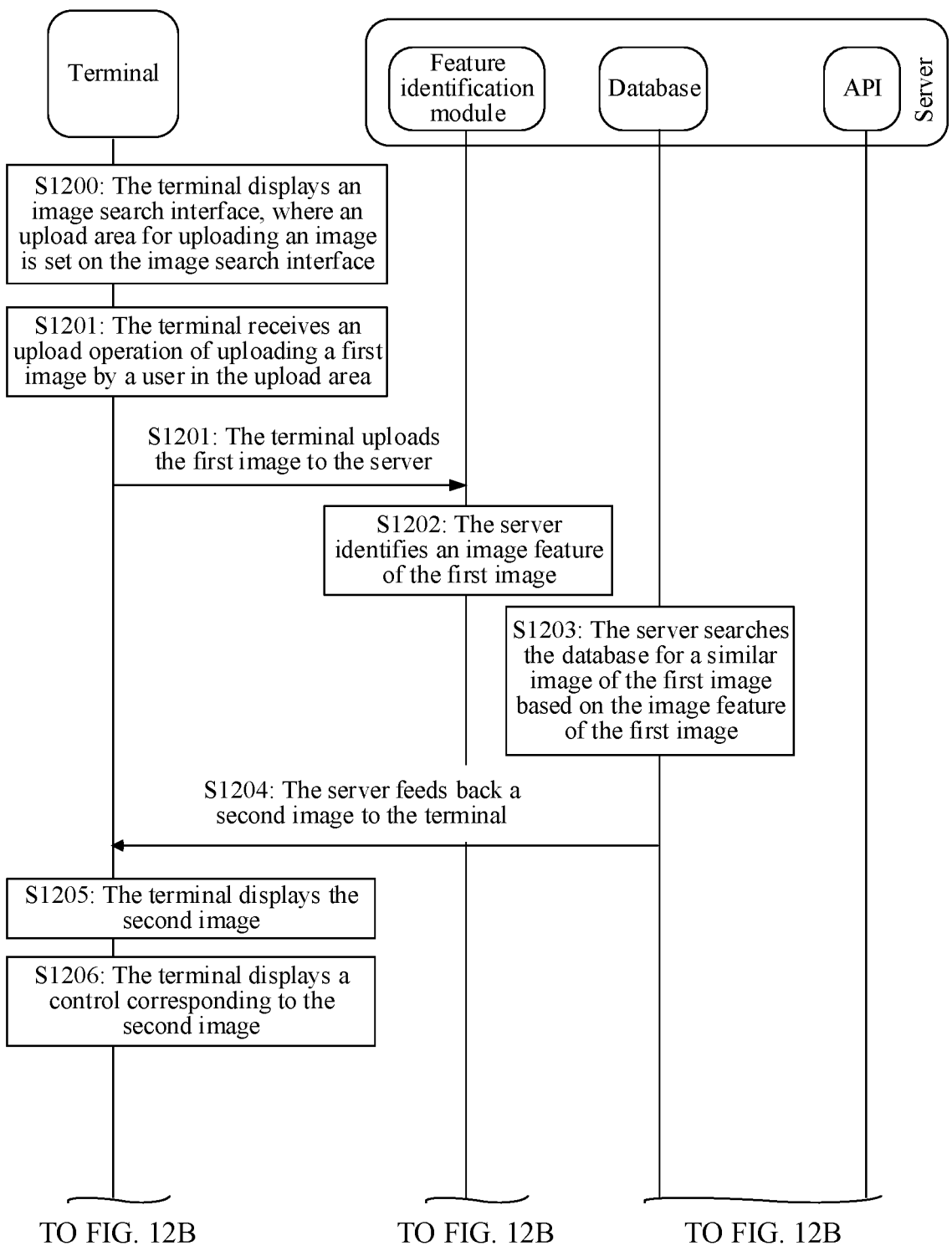
FIG. 12A and FIG. 12B are a schematic flowchart of an image search method according to an embodiment of this application.
Figure 12B:
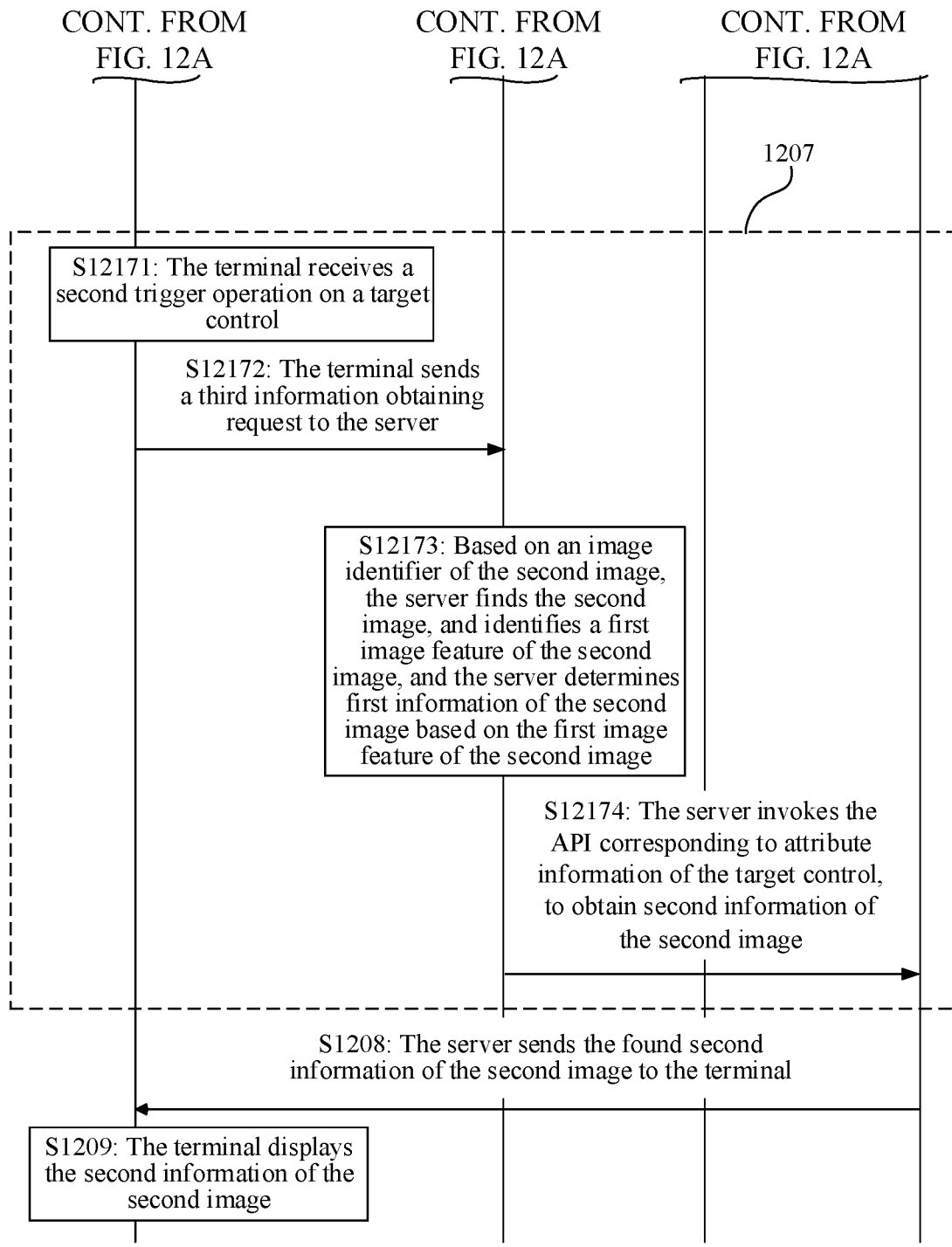

FIG. 12A and FIG. 12B are a schematic flowchart of an image search method according to an embodiment of this application. As shown in FIG. 12A and FIG. 12B, the method includes the following steps.

S1200: A terminal displays a first interface (for example, an image search interface), where an upload area for uploading an image is set on the image search interface.

When a user needs to search for a first image, the user may log in to the image search interface by using the terminal. For example, the user may start an image search APP on the terminal, and the APP displays the image search interface (for example, the interface 101 shown in FIG. 1). The user may upload the first image to the input box 105 shown in FIG. 1.

The input box may alternatively be replaced with a search box, a search bar, a query box, or the like. Certainly, the input box may alternatively be replaced with another noun. This is not specifically limited in this embodiment of this application.

The first image may be an image stored in a database, or may be an image obtained by invoking a camera to perform real-time photographing. This is not specifically limited in this embodiment of this application.

S1201: The terminal receives a first operation (such as an upload operation) of uploading the first image by the user in the upload area, and uploads the first image to a server. Correspondingly, the server receives the first image uploaded by a client.

After logging in to the image search interface by using the terminal, the user may upload the corresponding queried first image in the upload area on the image search interface, and the terminal may upload the first image to the server in response to the upload operation performed by the user. For example, when the terminal detects that the user taps an upload button in the upload area, the terminal may display a dialog box, where the dialog box may include an image stored in the terminal. The user may select, from the dialog box, the first image that needs to be uploaded to the server. After detecting that the user taps a finish button in the dialog box, the terminal uploads the first image selected by the user to the server.

After the terminal uploads the first image to the server, as shown in FIG. 1, the terminal may further display the uploaded first image on the image search interface, so that the user can view a comparison effect between a result image obtained through subsequent query and the first image.

S1202: The server identifies an image feature of the first image.

This step may be specifically implemented in the following manners: Manner 1: The server divides the first image into a plurality of grids, and extracts an image feature in each grid. Manner 2: The server inputs the first image into a feature extraction model, and outputs the image feature of the first image. The feature extraction model may be obtained by training based on a sample image and an image feature. Certainly, another manner may alternatively be used for implementation. This is not specifically limited in this embodiment of this application.

To more accurately identify the image feature of the first image, a specific implementation of Manner 1 may be as follows: After the user inputs the first image into the input box on the page displayed on the terminal, the terminal uploads the first image to the server. The server identifies a first image feature of the first image. The server determines, based on the first image feature of the first image, a first image type to which the first image belongs. The server identifies a second image feature of the first image, where the second image feature of the first image is determined based on the first image type, and the second image feature of the first image and the first image feature of the first image are features at different segmentation levels. For a specific example, refer to the following related content. Details are not described herein again. In this way, in a subsequent step, based on the second image feature of the first image, the server may identify image content of the first image, or search for an image related to the first image.

S1203: The server searches the database for a second image similar to the first image based on the image feature of the first image.

It should be understood that the server searches, based on the image feature of the first image, an image feature stored in the database for a target image feature that is the same as or similar to the image feature of the first image, and determines an image corresponding to the target image feature as the second image.

In a specific implementation, the server may alternatively determine, based on the image feature of the first image, that information corresponding to the image feature is first information of the first image. For example, the first information may be content information of the first image. Specifically, the content information of the first image may include an identifier of the first image, a name of the first image, an encyclopedia of the first image, a link address of the first image, and the like.

For example, the first image is an image of "Palace A". When the user inputs the image of "Palace A" into the input box on the page displayed on the terminal, the terminal uploads the image of "Palace A" to the server. The server identifies the image of "Palace A" to obtain an image of "Building A" and information of "Building A" (for example, a city of "Building A" is "City B", and weather of a location of "Building A"). The image of "Building A" is a similar image of the image of "Palace A".

In a specific implementation, the server presets, in the database, attribute information of a control corresponding to the image. When finding the second image, the server may determine the attribute information of the control corresponding to the second image. The attribute information of the control may vary with content of the image. For example, the image content may include information such as an encyclopedia of the image, a brief introduction of the image, a ticket of the image, and navigation of the image. Correspondingly, attributes of the control may include encyclopedia, a brief introduction, a ticket, and navigation.

Alternatively, in another specific implementation, the server presets a correspondence between an image type and attribute information of a control in the database. When finding the second image, the server may preliminarily determine that an image type of the second image is consistent with an image type of the first image. Further, the server may determine, based on the determined image type of the second image and the preset correspondence between an image type and attribute information of a control, the attribute information of the control corresponding to the second image.

S1204: The server feeds back the second image to the terminal, and correspondingly, the terminal receives the second image.

Certainly, the server may alternatively feed back the first information of the first image to the terminal, and correspondingly, the terminal receives the first information of the first image.

In addition, in a possible implementation, the server may further feed back, to the terminal, the attribute information of the control corresponding to the second image, and correspondingly, the terminal receives the attribute information of the control corresponding to the second image.

S1205: The terminal displays a third interface, where the third interface may include the second image.

There may be a plurality of second images. For example, the plurality of second images may include the result image 1, the result image 2, the result image 3, the result image 4, the result image 5, the result image 6, and the like shown in FIG. 1.

Certainly, the terminal may display the first information of the first image. For example, content identification shown in FIG. 1 is: There may be xx in the image and an encyclopedia introduction of xx.

S1206: The terminal displays a second interface, where the second interface may include the second image and the control corresponding to the second image.

For different cases, implementations in which the terminal displays the control corresponding to the second image are also different. Specific implementations are as follows.

In a first case, the terminal receives the attribute information of the control corresponding to the second image sent by the server, and the terminal directly displays, by using the control, the attribute information of the control corresponding to the second image.

As described above, the attribute information of the control corresponding to the second image is automatically determined by the server. For details, refer to related content in the foregoing embodiment. Details are not described again in this embodiment of this application.

In a second case, the terminal receives the attribute information of the control corresponding to the second image sent by the server, but the terminal does not directly display, by using the control, the attribute information of the control corresponding to the second image.

It should be understood that although the terminal receives the attribute information of the control corresponding to the second image sent by the server, the terminal does not display the attribute information of the control corresponding to the second image.

If the terminal displays the attribute information, the terminal needs to display the attribute information under a specific incentive. For example, the terminal may receive a first trigger operation on the second image, and in response to the first trigger operation, the terminal displays, by using the control, the attribute information of the control corresponding to the second image.

The first trigger operation may include a tapping operation, a sliding operation, a pressing operation, and the like. The tapping operation may include a single-tapping operation, a double-tapping operation, and the like. Certainly, the first trigger operation may further include a trigger operation in another form, for example, an operation of sliding a cursor over the second image, or an operation of moving the cursor to the second image. This is not specifically limited in this embodiment of this application.

In this embodiment of this application, the first trigger operation on the second image may be understood as the following several cases. A first case is a first trigger operation on an area in which the second image is located, in other words, the first trigger operation on the second image, or a first trigger operation on the display interface of the second image, in other words, the first trigger operation on the display interface but not on the second image. Certainly, there may be another case, which is not listed one by one herein.

In addition, the first trigger operation on the second image may be a first trigger operation directly performed by the user on the second image, for example, a finger of the user taps the second image. Alternatively, the first trigger operation may be a first trigger operation indirectly performed by the user on the second image. For example, the user moves a cursor of a mouse to the second image, or the user slides the cursor of the mouse over the second image.

The foregoing second image may refer to one of a plurality of similar images of the first image. For example, as shown in FIG. 3, the second image may refer to the result image 4. Certainly, the second image may alternatively refer to the result image 5 or the result image 6. Specific content of the second image is not specifically limited in this embodiment of this application.

In a third case, when receiving the second image, the terminal does not receive the attribute information of the control corresponding to the second image. The attribute information of the control corresponding to the second image may be set by the terminal by default, or may be set by the user.

Specific implementations are as follows.

First, the attribute information of the control corresponding to the second image is set by the terminal by default.

In S1204, the server feeds back the second image to the terminal, and correspondingly, the terminal receives the second image. After the terminal receives the second image, the terminal may determine, based on the second image and a prestored correspondence between an image and a control, the control corresponding to the second image, and display the control.

The prestored correspondence between an image and a control may mean that the control is pre-configured for the image. Specifically, the control may be configured based on the image type. For example, controls such as a ticket, weather, navigation, and an encyclopedia are configured for a scenic spot type. Controls such as a brief introduction, a deed, and work are configured for a character type. Controls such as a price, a review, and a detail are configured for a commodity type. Controls such as a feature, a growth environment, and a brief introduction are configured for an animal and plant type. Certainly, the control may alternatively be configured based on image content. For example, the image content includes brief introduction information, ticket information, weather information, and the like. Controls such as a brief introduction, a ticket, and weather are configured for the image content.

Second, the attribute information of the control corresponding to the second image is set by the user.

In S1204, the server feeds back the second image to the terminal, and correspondingly, the terminal receives the second image. After the terminal receives the second image sent by the server, when the terminal displays the second image on the interface, the terminal may pop up a control selection interface. The user may select the control on the control selection interface based on the displayed second image. After the user taps a selection completion button, the terminal receives an operation performed by the user on the selection completion button, and displays the selected control in the area of the second image. For example, the second image is "Building A", and the user may select controls such as "Ticket", "Encyclopedia", "Weather", and "Navigation" on the control selection interface. After the user selects the controls, the user taps the selection completion button, and the terminal displays the selected controls such as icket", "Encyclopedia", "Weather", and "Navigation" in an area in which "Building A" is located.

In a fourth case, when receiving the second image, the terminal does not receive the attribute information of the control corresponding to the second image. However, the terminal may request the server to obtain the attribute information of the control corresponding to the second image.

Specifically, the following manners may be used for implementation.

Manner 1: After the terminal displays the second image in S1205, the terminal receives the first trigger operation performed by the user on the second image. The terminal sends a first request (namely, a first information obtaining request) to the server, where the first information obtaining request carries an image identifier of the second image. Based on the image identifier of the second image, the server finds the second image, and identifies a first image feature of the second image. The server determines, based on the first image feature of the second image, a first image type to which the second image belongs. The server determines, based on the first image type and the prestored correspondence between an image type and attribute information of a control, the attribute information of the control corresponding to the second image.

The image type in the database may be pushed by another server, downloaded by the server, or prestored in the server.

The prestored correspondence between an image type and attribute information of a control may be described in the following manner by using an example. For example, the image type may include a scenic spot type, a character type, a commodity type, and an animal and plant type (which may also be referred to as an animal type and a plant type). Correspondingly, attribute information of a control corresponding to the scenic spot type may include information such as encyclopedia, weather, a ticket, and navigation. Attribute information of a control corresponding to the character type may include information such as a brief introduction, a deed, and work. Attribute information of a control corresponding to the commodity type may include information such as a price, a review, and a detail. Attribute information of a control corresponding to the animal and plant type may include information such as a variety, a growth environment, and a brief introduction. Certainly, the image type may also be further divided into a plurality of subtypes. For example, the character type may include a star type and an ordinary type. Attribute information of a control corresponding to the star type may include information such as encyclopedia, a related movie, and a relationship graph. Certainly, the attribute information of the control corresponding to the image type may alternatively be other information. This is not specifically limited in this embodiment of this application.

There may be at least one control. A quantity of the controls is in a one-to-one correspondence with an amount of the attribute information of the controls. For example, the attribute information of the control includes a ticket, weather, navigation, and encyclopedia. Correspondingly, the controls may include a "Ticket" control, a "Weather" control, a "Navigation" control, and an "Encyclopedia" control. The attribute information of the control includes encyclopedia, a related movie, and a related graph. Correspondingly, the controls may include an "Encyclopedia" control, a "Related movie" control, and a "Related graph" control.

In this embodiment of this application, image identification is performed on the second image by using coarse segmentation strength, to determine the image type of the second image and the attribute information of the control corresponding to the image type, so that the attribute information of the control displayed on the page on the terminal can be quickly determined without a need to perform refined analysis on the image content. This saves resources and facilitates operations.

In addition, in the foregoing implementation, automatic deployment of a query menu in a plurality of scenarios (for example, a scenic spot and a commodity) is implemented.

In another implementation, to implement content identification of a real-time online image, after the server determines, based on the first image feature of the second image, the first image type to which the second image belongs, the server may identify a second image feature of the second image based on the first image type, where the second image feature and the first image feature are determined by using different segmentation granularities. The server determines second attribute information (or referred to as first information of the second image) of the second image based on the second image feature of the second image.

The first information of the second image may include content information of the second image. For example, if the second image is an image of a first scenic spot, the content information of the second image may include information such as an encyclopedia of the first scenic spot, a ticket of the first scenic spot, weather of the first scenic spot, and navigation of the first scenic spot. If the second image is an image of a first character, the content information of the second image may include information such as a brief introduction of the first character, work of the first character, and a deed of the first character. If the second image is an image of a first commodity, the content information of the second image may include information such as a price of the first commodity, a link address of the first commodity, a detail of the first commodity, and a review of the first commodity. If the second image is an image of a first animal and plant, the content information of the second image may include information such as a feature of the first animal and plant, a growth environment of the first animal and plant, and a brief introduction of the first animal and plant. Certainly, the second image and the content information of the second image are not specifically limited in this embodiment of this application.

The second image feature and the first image feature are determined by using different segmentation granularities. Specifically, the first image feature of the second image may be obtained by the server by inputting the second image into a first convolutional neural network (CNN) model. The second image feature of the second image may be obtained by the server by inputting the second image into a second convolutional neural network model related to the first image type. That the first image type is related to the second convolutional neural network model may also be understood as that several image types and a correspondence between the image type and the second convolutional neural network model are prestored.

A segmentation granularity of the first convolutional neural network model is different from a segmentation granularity of the second convolutional neural network model. For example, the segmentation granularity of the first convolutional neural network model is greater than the segmentation granularity of the second convolutional neural network model. In other words, the second image may be roughly identified by using the first convolutional neural network model, to obtain the first image feature of the second image and determine the image type of the second image. Then, the second image is finely identified by using the second convolutional neural network model, to determine the second image feature of the second image based on image feature standards of different image types, and accurately identify information corresponding to the second image feature. For example, the server determines, by using the first convolutional neural network model, that the image type of the second image is a scenic spot type. The server obtains a second convolutional neural network model corresponding to the scenic spot type, and identifies information of the second image based on an image feature identification standard of the scenic spot type.

Certainly, if the server determines that the image type of the second image is not a prestored image type, the server may not perform an operation of identifying content of the second image, and the server may extract only the image feature of the second image, and return a similar image (or referred to as a result image of the second image) of the second image based on the image feature.

Specifically, the image feature that may be obtained by the server by using the first convolutional neural network model and the second convolutional neural network model may be global average pooling output at the last convolutional layer of the convolutional neural network model. After performing subsequent processing such as PCA (principal component analysis, principal component analysis) dimension reduction and feature enhancement on the image feature, the server needs to match the image feature with the image feature stored in the database, calculate a feature distance, sort similar images, and return the similar images.

Both the first convolutional neural network model and the second convolutional neural network model may use a network structure such as a residual network (ResNet) series, an Inception series, or an EfficientNet series.

Certainly, an image identification model or the feature extraction model is not necessarily a convolutional neural network model, or may be a conventional model, a combination of the two, or even a multi-modal classification model. This is not specifically limited in this embodiment of this application.

In this embodiment of this application, image identification is performed on the second image by using coarse segmentation strength, to determine the image type of the second image. Then, image identification is performed on the second image by using fine segmentation strength, to determine the first information of the second image. Therefore, in this embodiment of this application, image identification is performed on the similar image by using the coarse segmentation strength to the fine segmentation strength, so that real-time online image content identification can be implemented, to obtain image information.

Manner 2: If online real-time content identification cannot be satisfied by a device limited to computing resources, content identification may be performed on all images in the database once when the database is created offline, and an image content and an image feature are stored in the database together. The image content may include information such as an image type. When the terminal receives an operation of querying the image content by the user, the terminal sends an information obtaining request to the server, where the information obtaining request carries an image identifier. The server may read corresponding identification content from the database based on the image identifier.

Specifically, after the terminal displays the second image in S1205, the terminal receives the first trigger operation performed by the user on the second image. The terminal sends a second information obtaining request to the server, where the second information obtaining request carries the image identifier of the second image. The server finds the image type corresponding to the image identifier based on the image identifier of the second image, that is, determines the first image type to which the second image belongs. The server determines, based on the first image type and the prestored correspondence between an image type and attribute information of a control, the attribute information of the control corresponding to the second image.

In this embodiment of this application, content identification is performed on the image once when the database is created offline, to reduce computing overheads of online content identification, complete content identification on the image more quickly, and implement a faster query speed.

Manner 3: After the terminal displays the second image in S1205, the terminal receives the first trigger operation performed by the user on the second image. The terminal uploads the second image to the server. The server identifies the image feature of the second image. The server determines an image content of the second image based on the image feature of the second image. The server determines, based on the image content of the second image and the correspondence between an image content and attribute information of a control, the attribute information of the control corresponding to the second image.

The correspondence between an image content and attribute information of a control may be described by using the following example: For example, the second image is an image of a first scenic spot, and the content information of the second image may include information such as an encyclopedia of the first scenic spot, a ticket of the first scenic spot, weather of the first scenic spot, and navigation of the first scenic spot. Correspondingly, the attribute information of the control may include information such as the encyclopedia, the ticket, the weather, and the navigation. The second image is an image of a first character, and the content information of the second image may include information such as a brief introduction of the first character, work of the first character, and a deed of the first character. Correspondingly, the attribute information of the control may include information such as the brief introduction, the work, and the deed. The second image is an image of a first commodity, and the content information of the second image may include information such as a price of the first commodity, a link address of the first commodity, a detail of the first commodity, and a review of the first commodity. Correspondingly, the attribute information of the control may include information such as the price, the link address, the detail, and the review. The second image is an image of a first animal and plant, and the content information of the second image may include information such as a feature of the first animal and plant, a growth environment of the first animal and plant, and a brief introduction of the first animal and plant. Correspondingly, the attribute information of the control may include information such as the feature, the growth environment, and the brief introduction. Certainly, the second image and the content information of the second image are not specifically limited in this embodiment of this application.

In this embodiment of this application, image content information is identified on the second image, and the attribute information of the control is determined by using the content information of the second image. A specific information query option is determined for a specific image, to satisfy a personalized requirement of the user for the image.

S1207: The terminal receives a second operation (for example, a second trigger operation) on a first control (or referred to as a target control), and the terminal sends a third information obtaining request to the server, where the third information obtaining request carries the image identifier of the second image and attribute information of the target control. Correspondingly, the server receives the third obtaining request, and obtains first attribute information (or referred to as second information of the second image) of the second image based on the image identifier of the second image and the attribute information of the target control.

The second trigger operation may be consistent with the first trigger operation, or may be inconsistent with the first trigger operation. For example, the second trigger operation may include a tapping operation, a sliding operation, a pressing operation, and the like. The tapping operation may include a single-tapping operation, a double-tapping operation, and the like. Certainly, the first trigger operation may further include a trigger operation in another case, for example, an operation of sliding a cursor of a mouse or an operation of moving the cursor of the mouse to the target control. This is not specifically limited in this embodiment of this application.

The second trigger operation on the target control may be understood as a second trigger operation that the user directly performs on the target control, for example, a finger of the user taps/presses the target control. Alternatively, the user indirectly performs the second trigger operation on the target control. For example, the user moves the cursor of mouse to the target control, or the user slides the cursor of the mouse over the target control.

S1207 may be specifically implemented in the following manners.

Manner 1: As shown in FIG. 12A and FIG. 12B, S12171: The terminal receives the second trigger operation on the target control. S12172: The terminal sends a second request (namely, the third information obtaining request) to the server, where the third information obtaining request carries the image identifier of the second image and the attribute information of the target control. S12173: Based on the image identifier of the second image, the server finds the second image, and identifies the first image feature of the second image. The server determines the first information of the second image based on the first image feature of the second image. S12174: The server invokes, based on the image identifier of the second image, an application programming interface (API) corresponding to the attribute information of the target control, to obtain the second information of the second image.

For a specific implementation in which the server identifies the first image feature of the second image, refer to the foregoing technical solution of image identification. Details are not described again in this embodiment of this application.

Alternatively, as described above, to more accurately identify the image feature of the second image, S12173 may be specifically implemented as follows: After the server identifies the first image feature of the second image, the server determines, based on the first image feature of the second image, the first image type to which the second image belongs. The server identifies the second image feature of the second image, where the second image feature of the second image is determined based on the first image type, and the second image feature of the second image and the first image feature of the second image are features at different segmentation levels. The server determines the first information of the second image based on the second image feature of the second image.

Figure 13A:
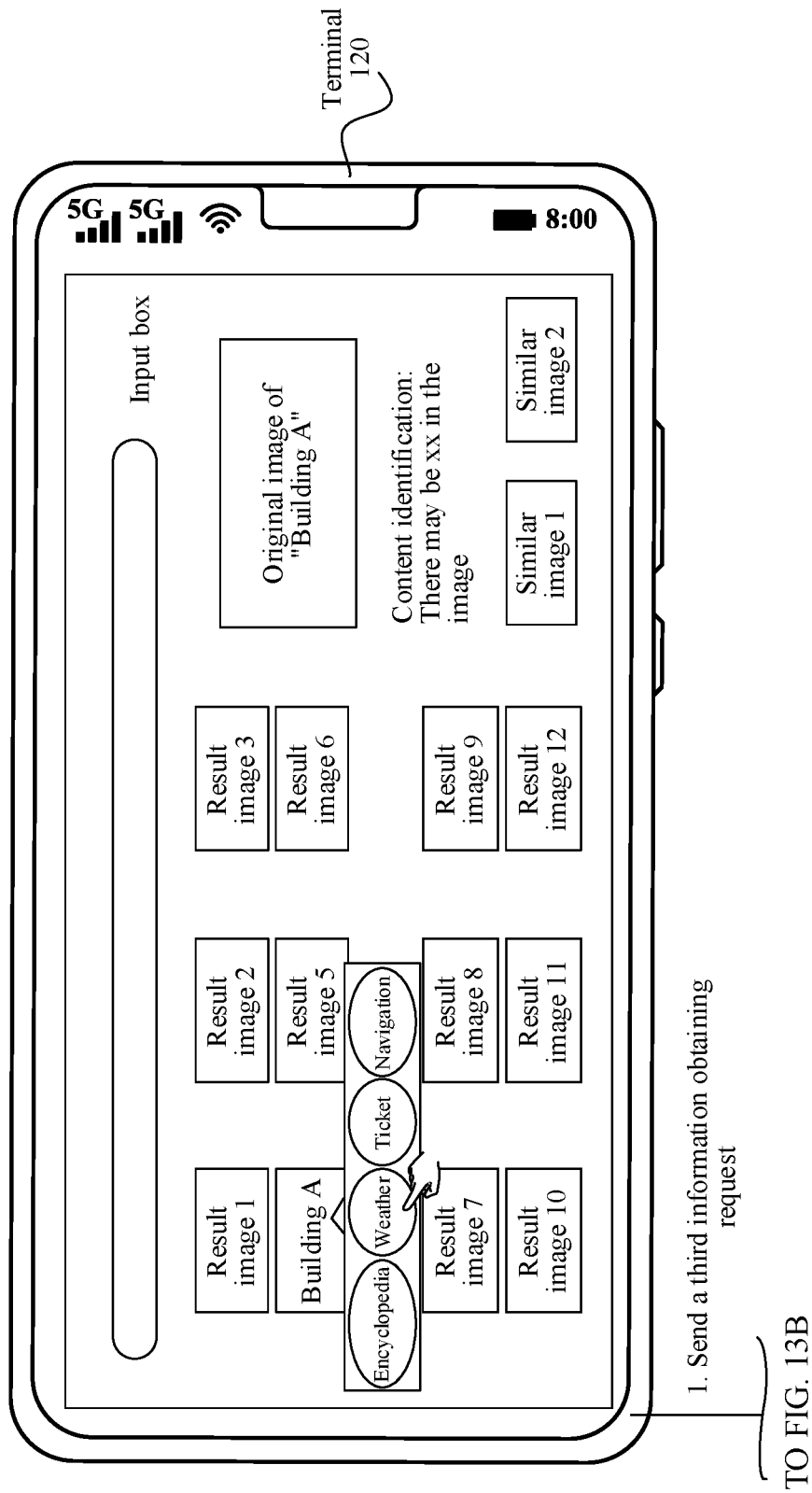
FIG. 13A, FIG. 13B, and FIG. 13C are a schematic diagram of an application scenario of an image search method according to an embodiment of this application.
Figure 13B:
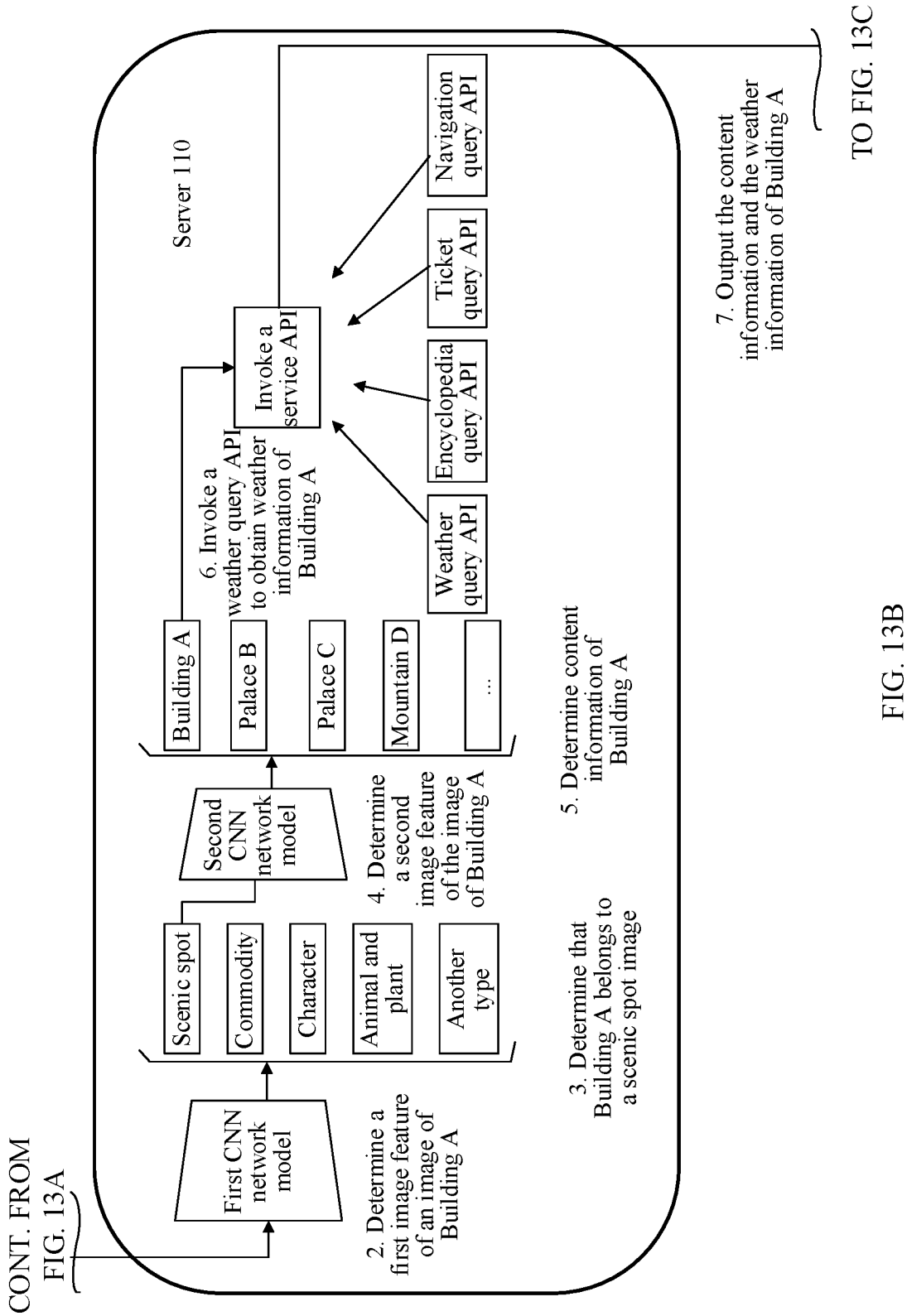
Figure 13C:
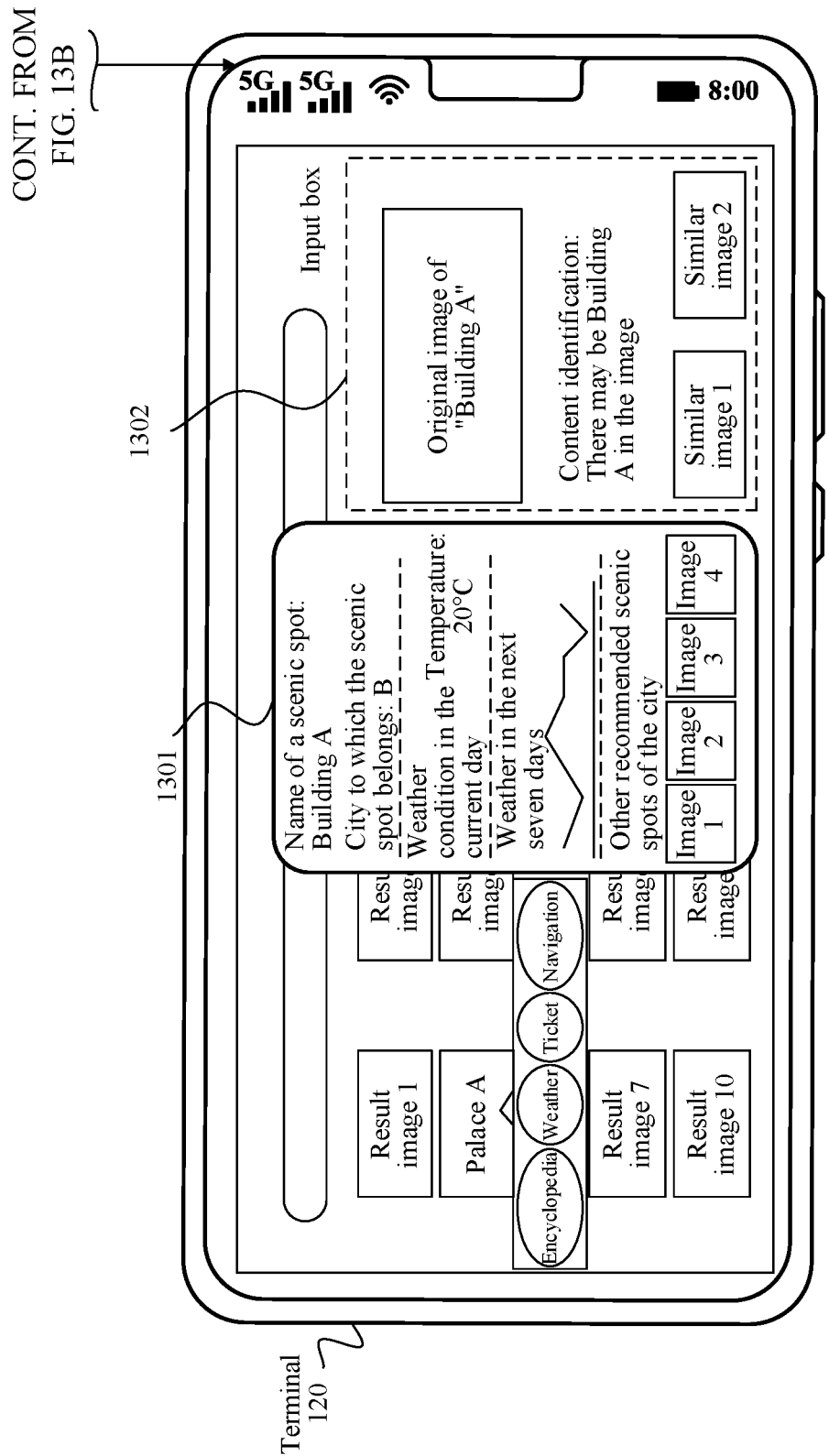

In an actual application scenario, FIG. 13A, FIG. 13B, and FIG. 13C are a schematic diagram of an application scenario of an image search method according to an embodiment of this application. As shown in FIG. 13A, FIG. 13B, and FIG. 13C, for example, the second image is Building A, and a display interface on a terminal 120 displays controls of Building A, including an "Encyclopedia" control, a "Weather" control, a "Ticket" control, and a "Navigation" control. When a user taps the "Weather" control, the terminal 120 receives a tapping operation performed by the user on the "Weather" control. 1. The terminal 120 sends a third information obtaining request to a server 110, where the third information obtaining request carries information about Building A and weather. 2. The server 110 searches for an image of Building A, inputs the image of Building A into a first CNN network model, and outputs a first image feature of the image of Building A. The first CNN network model identifies the first image feature of the image of Building A by using a first segmentation granularity. 3. The server 110 determines, based on the first image feature of the image of Building A, that the image of Building A is a scenic spot image. 4. The server 110 inputs the image of Building A into a second CNN network model, and outputs a second image feature of the image of Building A. The second CNN network model identifies the second image feature of the image of Building A by using a second segmentation granularity. The second segmentation granularity is less than the first segmentation granularity. In other words, the image feature identified by the second CNN network model is fine, and the image feature identified by the first CNN network model is coarse. 5. The server 110 determines content information of Building A based on the second image feature of the image of Building A. 6. The server 110 invokes a weather query API corresponding to weather information to obtain the weather information of Building A. 7. The server 110 outputs the weather information of Building A to the terminal 120. The terminal displays the weather information of Building A by using a card 1301, and the content information of Building A is displayed in a right dashed-line box area 1302 on the interface.

It can be learned that in this embodiment of this application, when the user performs the second trigger operation on the target control, the server invokes the API corresponding to attribute information of the target control to query second information of the second image. In this way, the user may select content to be queried, and the server returns corresponding query content in real time based on a query operation performed by the user, to implement more intelligent content identification of a similar image and information query.

Figure 14A:
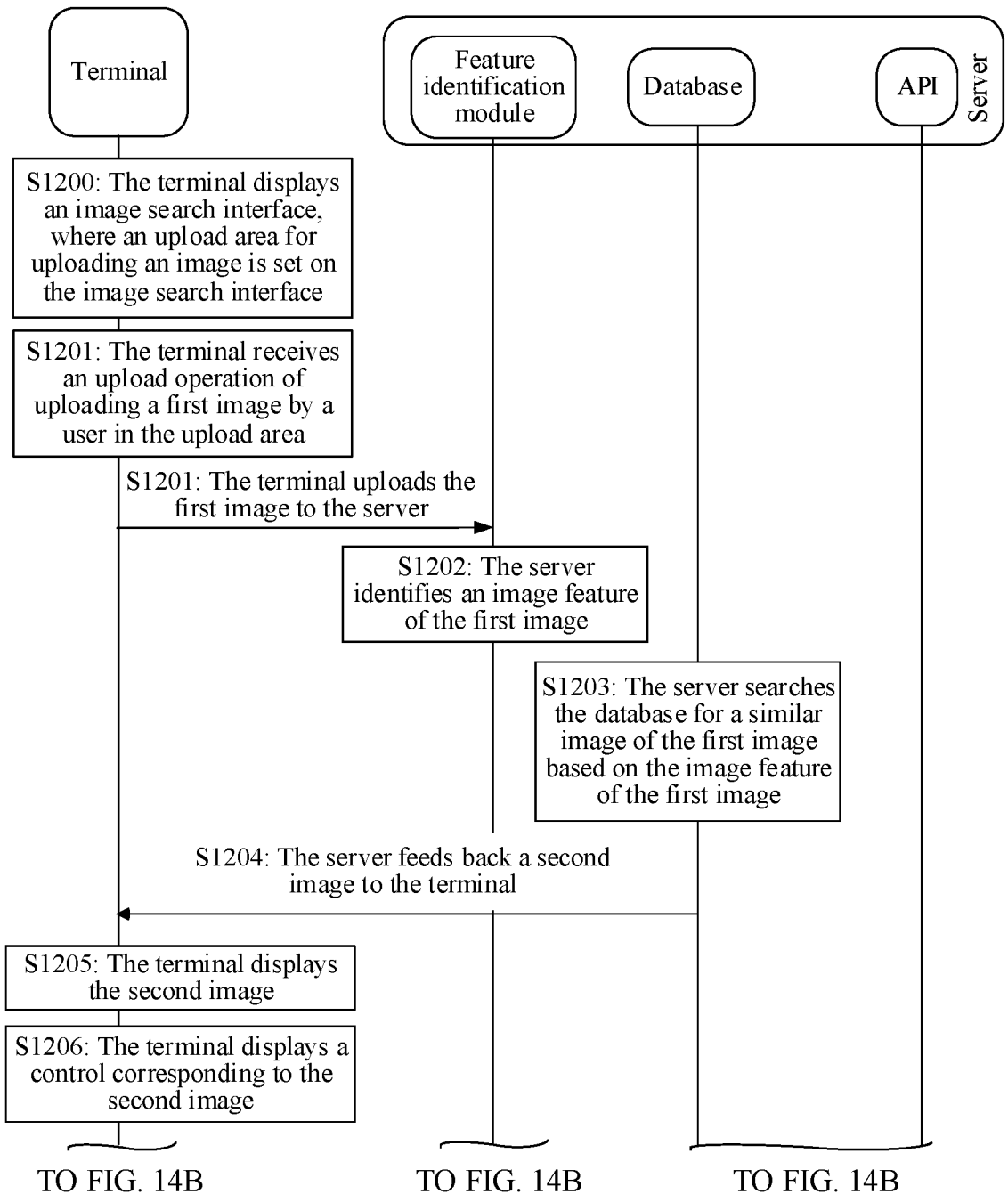
FIG. 14A and FIG. 14B are a flowchart of an image search method according to an embodiment of this application.
Figure 14B:
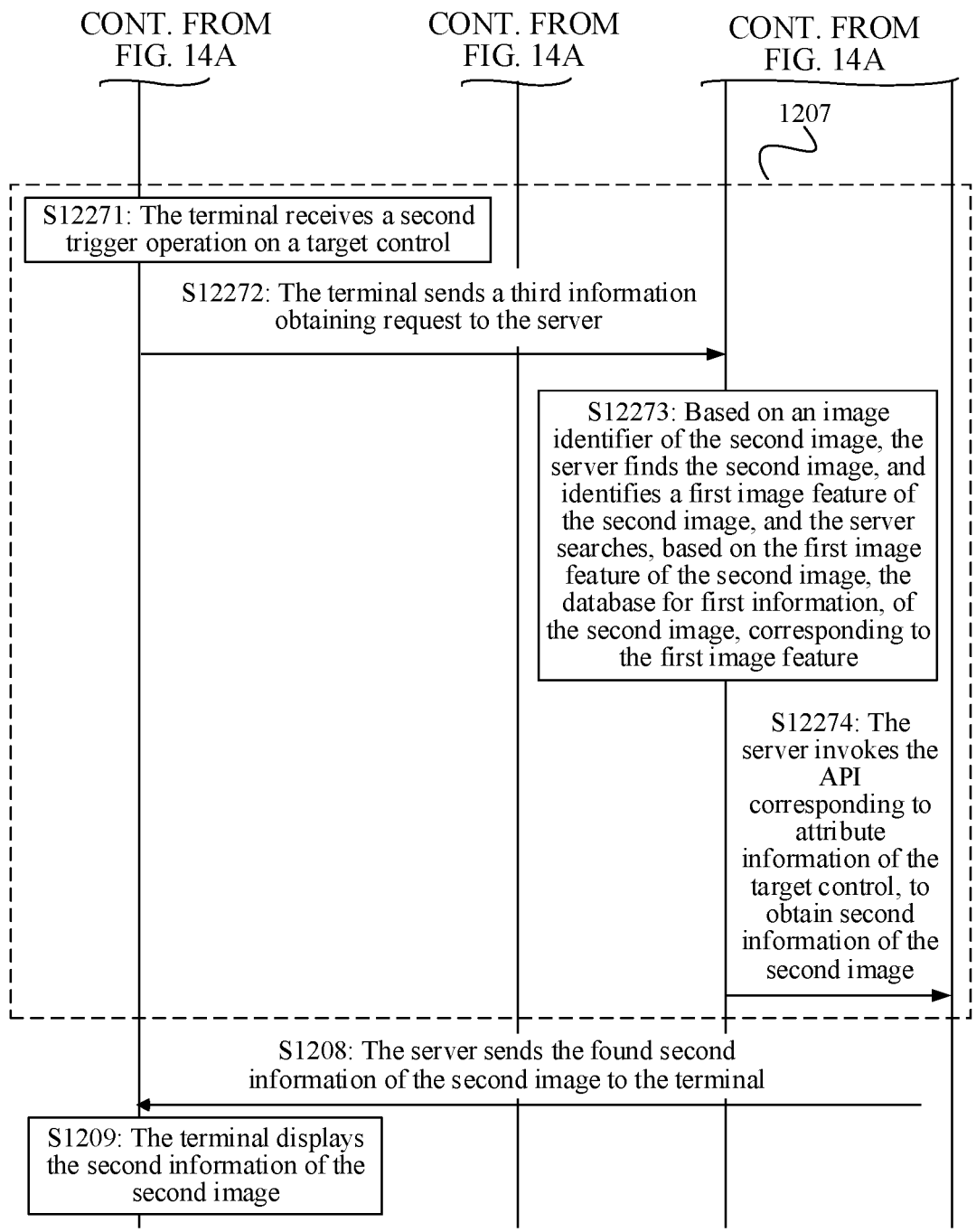

Manner 2: FIG. 14A and FIG. 14B are a flowchart of an image search method according to an embodiment of this application. As shown in FIG. 14A and FIG. 14B, S12271: The terminal receives the second trigger operation on the target control. S12272: The terminal sends the third information obtaining request to the server, where the third information obtaining request carries the image identifier of the second image and the attribute information of the target control. S12273: Based on the image identifier of the second image, the server finds the second image, and identifies the first image feature of the second image. The server searches, based on the first image feature of the second image, the database for the first information, of the second image, corresponding to the first image feature. S12274: The server invokes, based on the image identifier of the second image, an application programming interface API corresponding to target attribute information to obtain the second information of the second image.

Figure 15A:
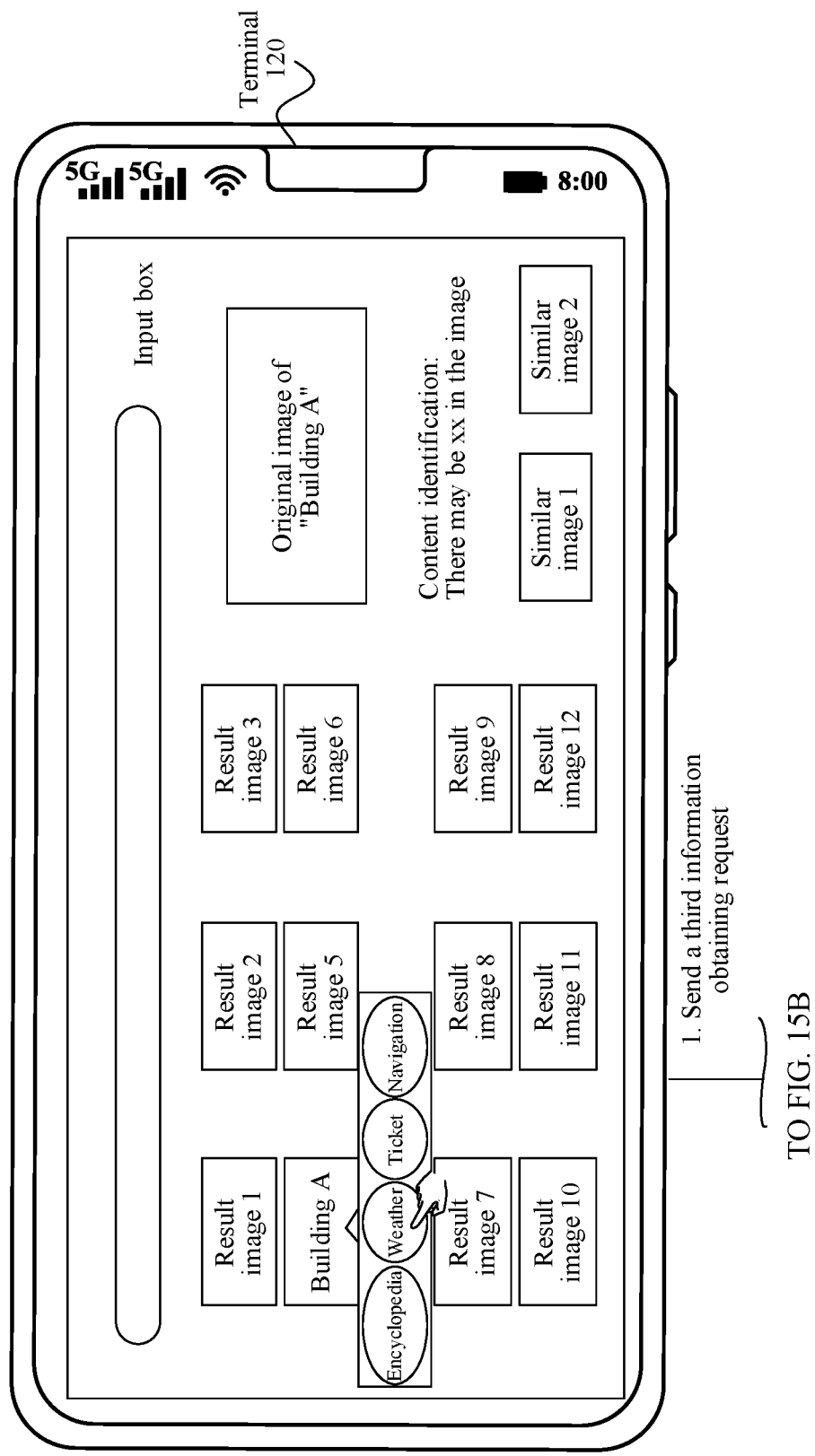
FIG. 15A, FIG. 15B, and FIG. 15C are a schematic diagram of an application scenario of an image search method according to an embodiment of this application.
Figure 15B:
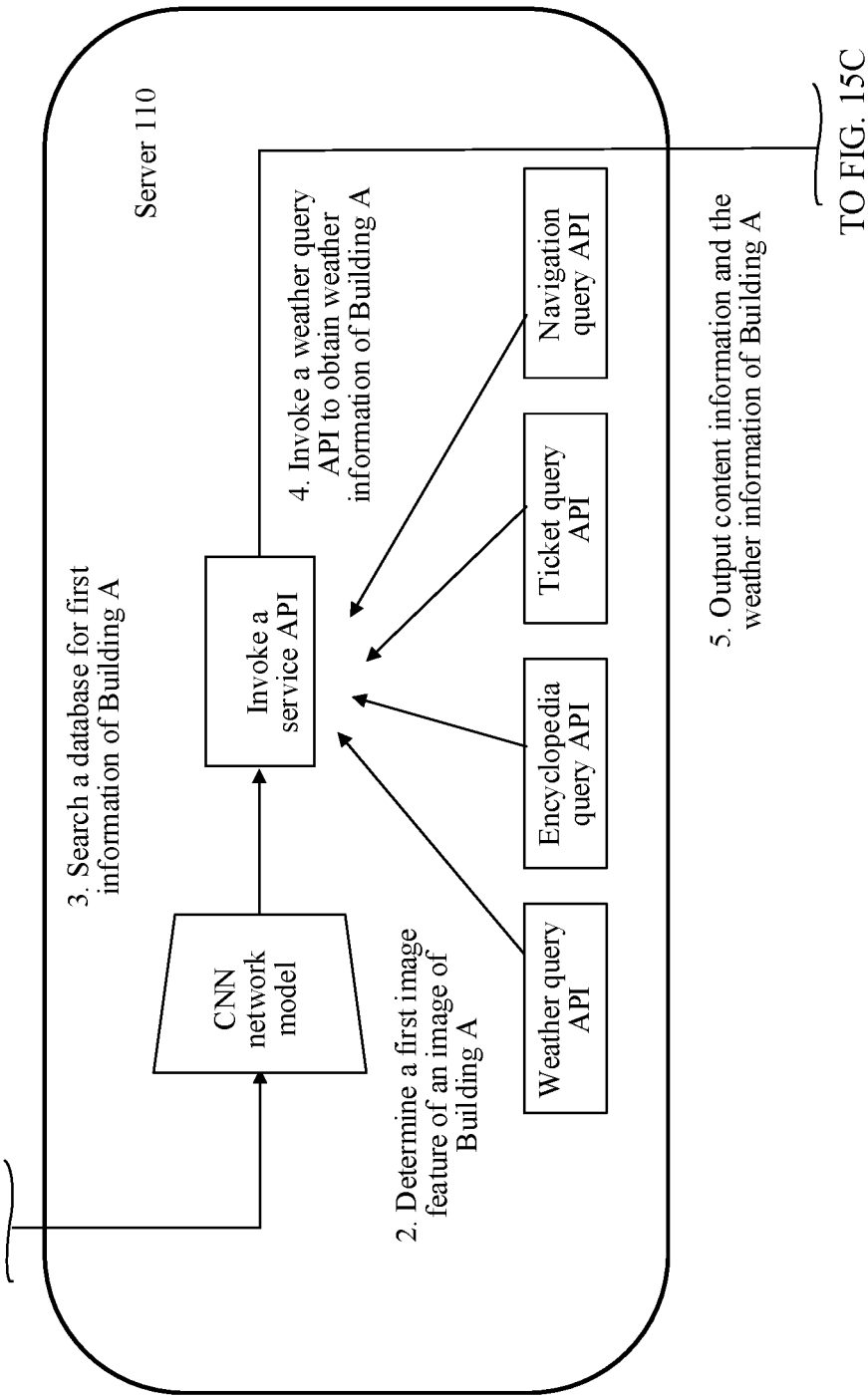
Figure 15C:
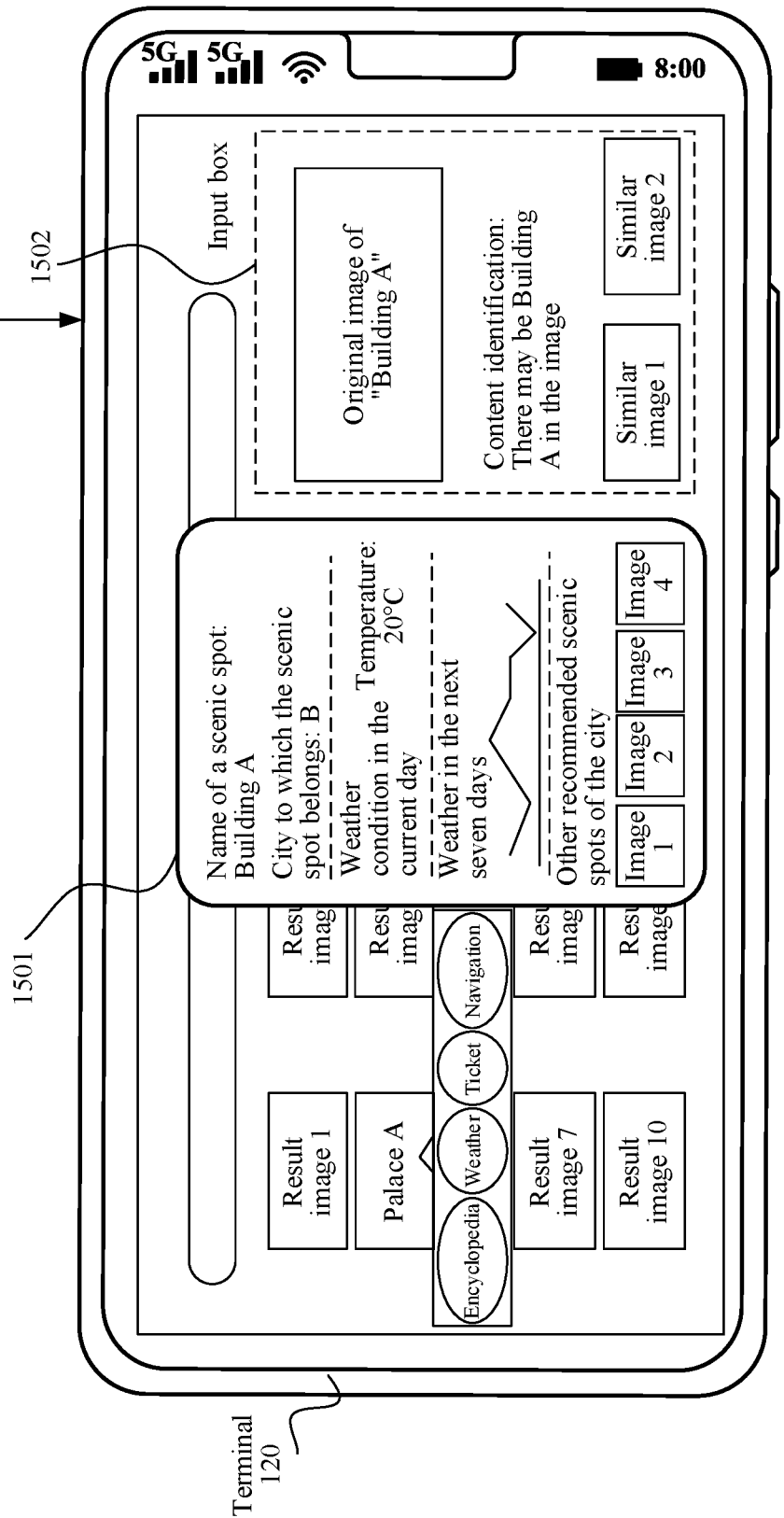

In an actual application scenario, FIG. 15A, FIG. 15B, and FIG. 15C are a schematic diagram of an application scenario of an image search method according to an embodiment of this application. As shown in FIG. 15A, FIG. 15B, and FIG. 15C, for example, the second image is Building A, and a display interface on a terminal 120 displays controls of Building A, including an "Encyclopedia" control, a "Weather" control, a "Ticket" control, and a "Navigation" control. When a user taps the "Weather" control, the terminal 120 receives a tapping operation performed by the user on the "Weather" control. 1. The terminal 120 sends a third information obtaining request to a server 110, where the third information obtaining request carries information about Building A and weather. 2. The server 110 searches for an image of Building A, inputs the image of Building A into a CNN network model, and outputs a first image feature of the image of Building A. 3. The server 110 searches, based on the first image feature of the image of Building A, the database for first information, of the image of Building A, corresponding to the first image feature. 4. The server 110 invokes, based on an image identifier of Building A, a weather query API corresponding to the weather information to obtain the weather information of Building A. 5. The server 110 outputs the weather information of Building A to the terminal 120. The terminal displays the weather information of Building A by using a card 1501, and content information of Building A is displayed in a right dashed-line box area 1502 on the interface.

It can be learned that in this embodiment of this application, when the user performs the second trigger operation on the target control, the server identifies the first image feature of the second image, queries the database based on the first image feature to obtain the first information of the second image, and invokes the API corresponding to the attribute information of the target control to query the second information of the second image. In this way, the server does not need to perform content identification on the second image, to reduce online computing overheads, save server resources, and quickly complete information query. In addition, the user may select content to be queried, and the server returns corresponding query content in real time based on a query operation performed by the user, to implement more intelligent content identification of a similar image and information query.

S1208: The server sends the found second information of the second image to the terminal, and correspondingly, the terminal receives the second information of the second image sent by the server.

S1209: The terminal displays the second information of the second image.

The client may display the second information of the second image in a preset form. The preset form may include a card form, a floating window form, a notification message form, or the like. Certainly, the preset form may further include another form. This is not listed one by one in this embodiment of this application.

The client displays the second information of the first result in the card form, to be specific, as shown in FIG. 9, FIG. 13A, FIG. 13B, and FIG. 13C, and FIG. 15A, FIG. 15B, and FIG. 15C, content displayed on the card is as follows: a name of a scenic spot: Building A; a city to which the scenic spot belongs: B; a current weather condition of the scenic spot, and a temperature: 20° C.; and a weather condition graph in the next seven days. Other scenic spots in City B are recommended: "Image 1", "Image 2", "Image 3", and "Image 4".

In this embodiment of this application, customization of a query function for different types of images (such as a scenic spot, a character, a commodity, and an animal and plant) is completed. Content identification of the similar image is completed, and real-time content information (such as real-time weather information) of the similar image may be automatically obtained based on a specific selection of the user. This greatly facilitates the user to obtain more content information of the similar image, and implements more intelligent display of a photographing search result.

For a specific implementation of this embodiment of this application, refer to the foregoing related content. Details are not described again in this embodiment of this application.

The solutions in the foregoing embodiments of this application may be combined on a premise that the solutions are not contradictory.

Figure 16:
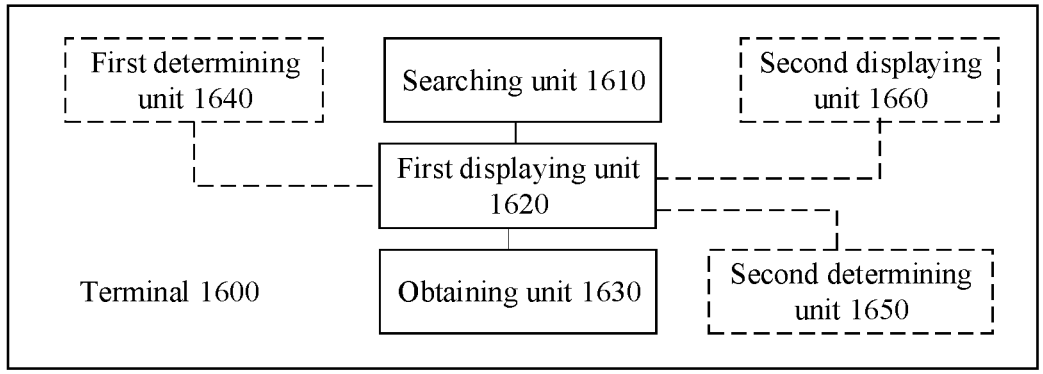
FIG. 16 is a schematic diagram of a structure of a terminal according to an embodiment of this application.

FIG. 16 is a schematic diagram of a structure of still another terminal according to an embodiment of this application. As shown in FIG. 16, the terminal 1600 may include:

a searching unit 1610, configured to: in response to receiving a first operation performed by a user on a first image on a first interface, request a server to search for a first image;

a first displaying unit 1620, configured to display a second interface, where the second interface includes a second image and one or more controls corresponding to the second image, the second image is an image that is associated with the first image and that is found by the server, and each of the one or more controls respectively corresponds to one or more pieces of attribute information of the second image; and an obtaining unit 1630, configured to: in response to receiving a second operation performed by the user on a first control in the one or more controls on the second interface, request the server to obtain first attribute information of the second image, where the first attribute information corresponds to the first control.

Further, the terminal 1600 may further include:

a first determining unit 1640, configured to determine, based on the second image and a prestored correspondence between an image and attribute information of a control, one or more controls corresponding to the second image.

Further, the terminal 1600 may further include:

a second determining unit 1650, configured to determine, based on a selection or setting operation performed by the user on the attribute information of the control, the one or more controls corresponding to the second image.

Further, the terminal 1600 may further include:

a second displaying unit 1660, configured to display a third interface, where the third interface includes the second image.

The first displaying unit 1620 is further configured to:

display the second interface in response to receiving a third operation performed by the user.

Further, the first displaying unit 1620 is further configured to:

in response to receiving the third operation performed by the user, send a first request to the server, where the first request carries an image identifier of the second image, and the server is configured to: determine, based on the image identifier of the second image, an image type to which the second image belongs, determine the attribute information of the control based on the image type to which the second image belongs, and return the attribute information of the control; and receive the attribute information of the control, and display the control on the second interface.

Further, the image type to which the second image belongs is a scenic spot type. Correspondingly, attribute information of the first control includes any one of a ticket, weather, navigation, and encyclopedia.

The image type to which the second image belongs is a character type. Correspondingly, attribute information of the first control includes any one of a brief introduction, a deed, or work;

The image type to which the second image belongs is a commodity type. Correspondingly, attribute information of the first control includes any one of a price, a review, and a detail.

The image type to which the second image belongs is an animal and plant type. Correspondingly, attribute information of the first control includes any one of a feature, a growth environment, and a brief introduction.

Further, the third operation includes at least one of the following operations:

an operation on the second image;

an operation of sliding a cursor of a mouse over the second image; or an operation of moving a cursor of a mouse to a related area of the second image.

Further, the obtaining unit 1630 is further configured to:

send a second request to the server in response to receiving the second operation performed by the user on the first control on the second interface, where the second request carries the image identifier of the second image and the attribute information of the first control, and the server is configured to search for the first attribute information of the second image based on the image identifier of the second image and the attribute information of the first control, and return the first attribute information; and receive the first attribute information of the second image.

Further, the server is further configured to invoke, based on the image identifier of the second image, an application program API corresponding to the attribute information of the first control to search for the first attribute information of the second image.

In this embodiment of this application, the server returns a similar image (namely, the second image) of the first image to the terminal. When displaying the second image, the terminal further displays controls of a plurality of attributes corresponding to the second image. When the terminal detects that the user operates the first control corresponding to the second image on the interface, the terminal triggers the server to obtain the first attribute information of the second image, where the first attribute information corresponds to the first control. It can be learned that the user can search for personalized information of the image by operating the first control, to satisfy a search requirement of the user in an actual application scenario. In addition, the user does not need to repeatedly perform operations such as uploading an image and inputting a query keyword to query the first attribute information, so that the user quickly queries the first attribute information of the second image.

Figure 17:
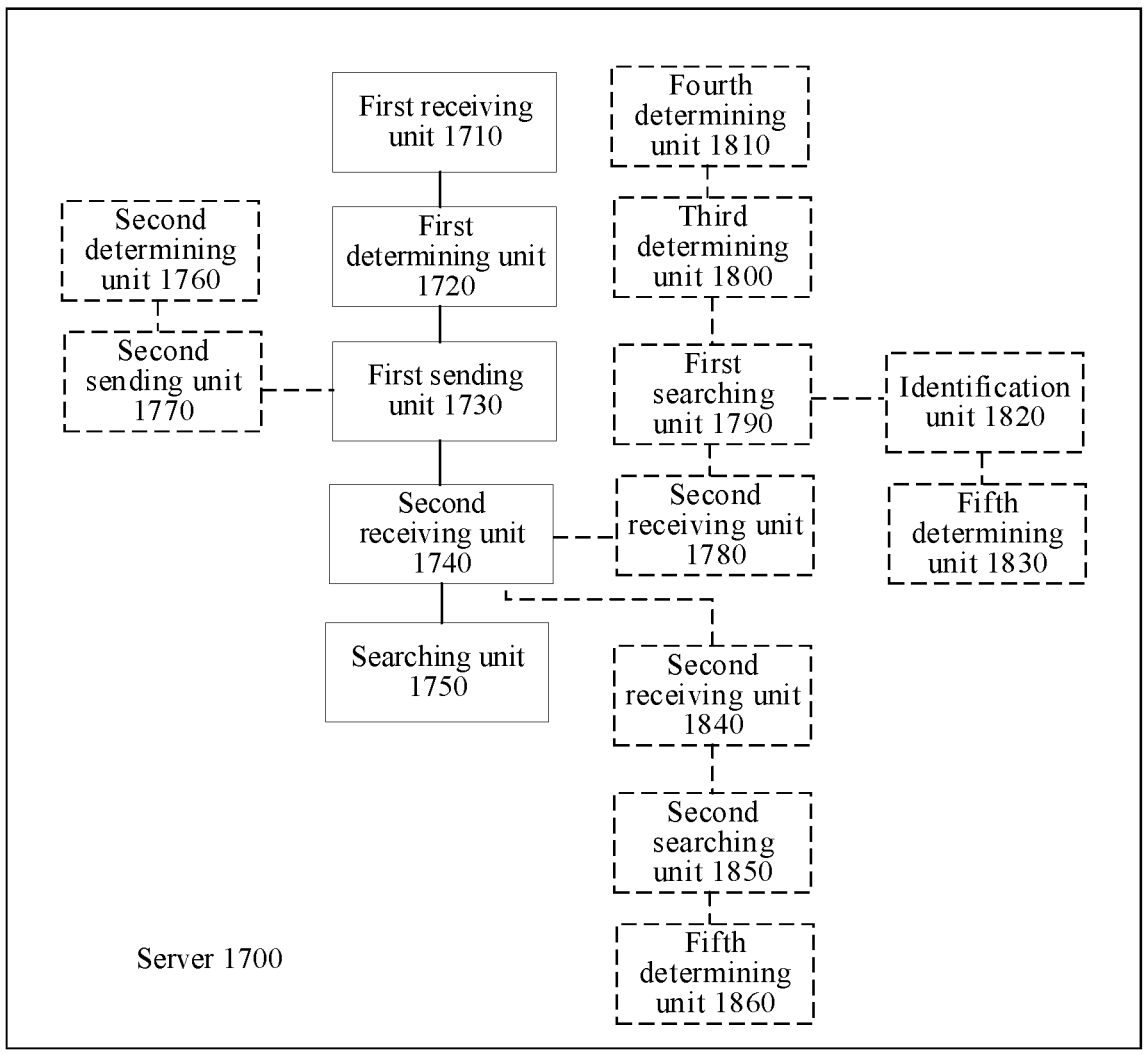
FIG. 17 is a schematic diagram of a structure of still another server according to an embodiment of this application.

FIG. 17 is a schematic diagram of a structure of still another server according to an embodiment of this application. As shown in FIG. 17, the server 1700 includes:

a first receiving unit 1710, configured to receive a first image uploaded by a terminal;

a first determining unit 1720, configured to determine, based on the first image, a second image corresponding to the first image;

a first sending unit 1730, configured to send the second image to the terminal;

a second receiving unit 1740, configured to receive a first request sent by the terminal, where the first request carries an image identifier of the second image and attribute information of a first control corresponding to the second image, and the attribute information of the first control is determined based on an image type of the second image; and a searching unit 1750, configured to search for first attribute information of the second image based on the image identifier of the second image and the attribute information of the first control.

Further, the searching unit 1750 is further configured to:

invoke, based on the image identifier of the second image, an application programming interface API corresponding to the attribute information of the first control, to query the first attribute information of the second image.

Further, the server 1700 further includes:

a second determining unit 1760, configured to determine the attribute information of the first control corresponding to the second image; and a second sending unit 1770, configured to send, to the terminal, attribute information of the first control corresponding to the second image.

Further, the second determining unit 1760 is further configured to:

determine the image type of the second image; and determine, based on the image type to which the second image belongs and a prestored correspondence between an image type and attribute information of a control, the attribute information of the first control corresponding to the second image.

Further, the image type to which the second image belongs is a scenic spot type. Correspondingly, the attribute information of the first control includes any one of a ticket, weather, navigation, and encyclopedia.

the image type to which the second image belongs is a character type. Correspondingly, the attribute information of the first control includes any one of a brief introduction, a deed, and work;

The image type to which the second image belongs is a commodity type. Correspondingly, the attribute information of the first control includes any one of a price, a review, and a detail.

The image type to which the second image belongs is an animal and plant type. Correspondingly, the attribute information of the first control includes any one of a feature, a growth environment, and a brief introduction.

Further, the server 1700 further includes:

a second receiving unit 1780, configured to receive a second request sent by the terminal, where the second request carries the image identifier of the second image;

a first searching unit 1790, configured to: based on the image identifier of the second image, search for the second image, and identify a first image feature of the second image;

a third determining unit 1800, configured to determine, based on the first image feature of the second image, the image type to which the second image belongs; and a fourth determining unit 1810, configured to determine, based on the image type to which the second image belongs and a prestored correspondence between an image type and attribute information of a control, the attribute information of the first control corresponding to the second image.

Further, the server 1700 further includes:

an identification unit 1820, configured to identify a second image feature of the second image, where the second image feature of the second image is determined based on the image type to which the second image belongs, and the second image feature of the second image and the first image feature of the second image are features at different segmentation levels; and a fifth determining unit 1830, configured to determine second attribute information of the second image based on the second image feature of the second image, where the second attribute information is different from the first attribute information.

Further, the server 1700 further includes:

a second receiving unit 1840, configured to receive a second request sent by the terminal, where the second request carries the image identifier of the second image;

a second searching unit 1850, configured to search, based on the image identifier of the second image, for the image type to which the second image belongs; and a fifth determining unit 1860, configured to determine, based on the image type to which the second image belongs and a prestored correspondence between an image type and attribute information of a control, the attribute information of the first control corresponding to the second image.

In this embodiment of this application, the server returns a similar image (namely, the second image) of the first image to the terminal. When displaying the second image, the terminal further displays controls of a plurality of attributes corresponding to the second image. When the terminal detects that the user operates the first control corresponding to the second image on the interface, the terminal triggers the server to obtain the first attribute information of the second image, where the first attribute information corresponds to the first control. It can be learned that the user can search for personalized information of the image by operating the first control, to satisfy a search requirement of the user in an actual application scenario. In addition, the user does not need to repeatedly perform operations such as uploading an image and inputting a query keyword to query the first attribute information, so that the user quickly queries the first attribute information of the second image.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product is run on a computer, the computer is enabled to perform any one of the foregoing methods.

An embodiment of this application further provides a chip. The chip includes a processor and an interface circuit. The interface circuit is coupled to the processor. The processor is configured to run a computer program or instructions, to implement the foregoing method. The interface circuit is used to communicate with a module other than the chip.

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

In descriptions of this application, words such as "example" or "for example" are used to give an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner.

The foregoing descriptions about the implementations allow a person skilled in the art to clearly understand that, for the purpose of convenient and brief description, division of the foregoing functional modules is merely used as an example for description. In an actual application, the foregoing functions can be allocated to different functional modules and implemented as required, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division of the modules and the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the current technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An image search method applied to a terminal, wherein the method comprises:
   requesting, in response to receiving an operation performed by a user on a first image on a first interface, a server search for a second image associated with the first image;
   displaying a second interface comprising a second image and one or more controls associated with the second image,
      wherein each of the one or more controls associated with the second image presents to the user an image attribute that may be an attribute of the second image,
      wherein the second image is associated with the first image and is found by the server, and
      wherein each of the one or more controls associated with the second image presents to the user an image attribute associated an image attribute of the second image; and
   requesting, in response to receiving an operation performed by the user on a first control in the one or more controls on the second interface, the server to obtain attribute information of the second image based on the image attribute associated with the first control,
      wherein the request carries an image identifier of the second image and the image attribute of the first control, and
      wherein the image attribute of the first control is based on an image type of the second image.

2. The method according to claim 1, wherein before displaying the second interface, the method further comprises:
   determining, based on the second image and a prestored association between an image and attribute information of a control, the one or more controls associated with the second image.

3. The method according to claim 1, wherein before displaying the second interface, the method further comprises:
   determining, based on a selection or setting operation performed by the user on the attribute information of the control, the one or more controls associated with the second image.

4. The method according to claim 1, wherein before displaying the second interface, the method comprises:
   displaying a third interface comprising the second image; and
   wherein displaying the second interface is in response to receiving an operation performed by the user.

5. The method according to claim 4, further comprising:
   receiving the attribute information of the first control, and displaying the first control on the second interface.

6. The method according to claim 5, wherein
   the image type to which the second image belongs is a scenic spot type, and correspondingly, attribute information of the first control comprises any one of a ticket, weather, navigation, and encyclopedia;
   the image type to which the second image belongs is a character type, and correspondingly, attribute information of the first control comprises any one of a brief introduction, a deed, and work;

the image type to which the second image belongs is a commodity type, and correspondingly, attribute information of the first control comprises any one of a price, a review, and a detail; or the image type to which the second image belongs is an animal and plant type, and correspondingly, attribute information of the first control comprises any one of a feature, a growth environment, and a brief introduction.

7. The method according to claim 4, wherein the operation causing the second interface to be displayed comprises at least one of the following operations:

an operation on the second image;

an operation of sliding a cursor of a mouse over the second image; or an operation of moving a cursor of a mouse to a related area of the second image.

8. The method according to claim 1, wherein the method further comprises receiving the attribute information of the second image.

9. The method according to claim 8, wherein the server is enabled to invoke, based on the image identifier of the second image, an application programming interface (API) associated with the attribute information of the first control, to search for the attribute information of the second image.

10. An image search method applied to a server, wherein the method comprises:

receiving a first image uploaded by a terminal;

determining, based on the first image, a second image associated with the first image;

sending the second image to the terminal;

receiving a first request sent by the terminal, wherein the first request carries an image identifier of the second image and attribute information of a first control associated with the second image, and the attribute information of the first control is determined based on an image type of the second image; and searching for first attribute information of the second image based on the image identifier of the second image and the attribute information of the first control.

11. The method according to claim 10, wherein searching for the first attribute information of the second image based on the image identifier of the second image and the attribute information of the first control comprises:

invoking, based on the image identifier of the second image, an application programming interface (API) associated with the attribute information of the first control, to query the first attribute information of the second image.

12. The method according to claim 10, wherein before the sending the second image to the terminal, the method further comprises:

determining the attribute information of the first control associated with the second image; and sending, to the terminal, the attribute information of the first control associated with the second image.

13. The method according to claim 12, wherein determining the attribute information of the first control associated with the second image comprises:

determining the image type of the second image; and determining, based on the image type to which the second image belongs and a prestored association between an image type and attribute information of a control, the attribute information of the first control associated with the second image.

14. The method according to claim 13, wherein the image type to which the second image belongs is a scenic spot type, and correspondingly, the attribute information of the first control comprises any one of a ticket, weather, navigation, and encyclopedia;

the image type to which the second image belongs is a character type, and correspondingly, the attribute information of the first control comprises any one of a brief introduction, a deed, and work;

the image type to which the second image belongs is a commodity type, and correspondingly, the attribute information of the first control comprises any one of a price, a review, and a detail; or the image type to which the second image belongs is an animal and plant type, and correspondingly, the attribute information of the first control comprises any one of a feature, a growth environment, and a brief introduction.

15. The method according to claim 10, wherein before receiving the first request sent by the terminal, the method further comprises:

receiving a second request sent by the terminal, wherein the second request carries the image identifier of the second image;

based on the image identifier of the second image, searching for the second image and identifying a first image feature of the second image;

determining, based on the first image feature of the second image, the image type to which the second image belongs; and determining, based on the image type to which the second image belongs and a prestored association between an image type and attribute information of a control, the attribute information of the first control associated with the second image.

16. The method according to claim 15, wherein after determining, based on the first image feature of the second image, the image type to which the second image belongs, the method comprises:

identifying a second image feature of the second image, wherein the second image feature of the second image is determined based on the image type to which the second image belongs, and the second image feature of the second image and the first image feature of the second image are features at different segmentation levels; and determining second attribute information of the second image based on the second image feature of the second image, wherein the second attribute information is different from the first attribute information.

17. The method according to claim 10, wherein before receiving the first request sent by the terminal, the method further comprises:

receiving a second request sent by the terminal, wherein the second request carries the image identifier of the second image;

searching, based on the image identifier of the second image, for the image type to which the second image belongs; and determining, based on the image type to which the second image belongs and a prestored association between an image type and attribute information of a control, the attribute information of the first control associated with the second image.

18. A terminal comprising:

a memory having processor-executable instructions stored thereon; and a processor coupled to the memory and configured to execute the processor-executable instructions in the memory to facilitate the following being performed by the terminal:
- in response to receiving a first operation performed by a user on a first image on a first interface, request a server to search for the first image;
- display a second interface comprising a second image and one or more controls associated with the second image,
  - wherein the second image is associated with the first image and that is found by the server, and
  - wherein each of the one or more controls respectively is associated with one or more pieces of attribute information of the second image; and
- in response to receiving a second operation performed by the user on a first control in the one or more controls on the second interface, request the server to obtain first attribute information of the second image, wherein the first attribute information associated with the first control.

19. The terminal according to claim 18, wherein the processor is further configured to execute the processor-executable instructions in the memory to facilitate the following being performed by the terminal:
- determine, based on the second image and a prestored association between an image and attribute information of a control, the one or more controls associated with the second image.

20. The terminal according to claim 18, wherein the processor is further configured to execute the processor-executable instructions in the memory to facilitate the following being performed by the terminal:
- determine, based on a selection or setting operation performed by the user on the attribute information of the control, the one or more controls corresponding to the second image.

* * * * *